(12) United States Patent
Beukes et al.

(10) Patent No.: US 11,346,976 B2
(45) Date of Patent: May 31, 2022

(54) IMAGING APPARATUS

(71) Applicant: INSIGHT SYSTEMS (PTY) LTD., Pretoria (ZA)

(72) Inventors: Salomo Jacobus Beukes, Pretoria (ZA); Petrus Gerhardus Van Wyk, Pretoria (ZA)

(73) Assignee: Insight Systems, Ltd., Pretoria (ZA)

( * ) Notice: Subject to any disclaimer, the term of this patent is extended or adjusted under 35 U.S.C. 154(b) by 0 days.

(21) Appl. No.: 16/760,140

(22) PCT Filed: Oct. 30, 2018

(86) PCT No.: PCT/IB2018/058486
§ 371 (c)(1),
(2) Date: Apr. 29, 2020

(87) PCT Pub. No.: WO2019/087061
PCT Pub. Date: May 9, 2019

(65) Prior Publication Data
US 2020/0348439 A1    Nov. 5, 2020

(30) Foreign Application Priority Data

Nov. 1, 2017 (ZA) .................................. 2017/07413
Nov. 1, 2017 (ZA) .................................. 2017/07414

(51) Int. Cl.
*G01V 5/00* (2006.01)

(52) U.S. Cl.
CPC .................................. *G01V 5/0066* (2013.01)

(58) Field of Classification Search
CPC ..... G01V 5/0008; G01V 5/0066; G01V 5/0016
See application file for complete search history.

(56) References Cited

U.S. PATENT DOCUMENTS

| 2009/0116617 A1* | 5/2009 | Mastronardi | ........ G01V 5/0025 |
| | | | 378/87 |
| 2012/0243656 A1* | 9/2012 | Jin | ........................ G01N 23/046 |
| | | | 378/10 |
| 2016/0232769 A1* | 8/2016 | Jarvi | ..................... G01V 5/0025 |
| 2017/0241185 A1* | 8/2017 | Osann, Jr. | ............. E05F 17/002 |

\* cited by examiner

*Primary Examiner* — Chih-Cheng Kao
(74) *Attorney, Agent, or Firm* — Cooper & Maersch LLC; Lorri W. Cooper

(57) ABSTRACT

An imaging apparatus 10 for generating an image of a subject including a scanning arrangement which includes an energy emitting source 20 and a detector 22 housed within a housing 12. The housing defines a scanning zone 24 in which the subject is operatively positioned for scanning A displacing arrangement 36 which includes a U-shaped belt-and-pulley drive arrangement is configured to displace the scanning arrangement relative to the housing 12 in a scanning direction. The housing 12 has a first door and second door defining a substantially linear pathway through the scanning zone. A motor 38 and horizontal drive belts 40 are disposed below the scanning zone and are not displaced relative to the housing in the scanning direction in which the energy emitting source and detector are displaced during scanning such that the displacing arrangement does not restrict or impede movement of the subject through the scanning zone.

16 Claims, 22 Drawing Sheets

IMAGING APPARATUS

FIELD OF THE INVENTION

This invention relates, generally, to imaging and screening of subjects. More specifically, the invention relates to an imaging apparatus, a screening arrangement and a screening kit. The invention also relates to a method of screening a subject. The invention further relates to a container unit and to a method of manufacturing a container unit.

BACKGROUND OF THE INVENTION

U.S. patent application Ser. No. 15/588,617 (published as US 2017/0241185 A1) in the name of OSANN, Robert entitled "Moving Door System Synchronized with Pedestrians Passing There-Through" discloses a portal apparatus for securely controlling passage which uses a passageway with at least two moveable door panels that operate in conjunction with at least two sidewalls and at least one linear sidewall. The apparatus includes position sensors for tracking a position of a subject passing through the passageway and determining a rate of movement of the subject. While the subject is walking through the passageway, each door panels is controlled to move at the determined rate of movement of the subject.

U.S. patent application Ser. No. 14/247,837 (published as US 2015/0048251 A1) in the name of Nuctech Company Limited entitled "Millimeter Wave Holographic Scan Imaging Apparatus for Human Body Security Inspection" discloses a millimeter wave holographic scan imaging apparatus for inspecting a human body. The apparatus includes a first millimeter wave transceiver device comprising a first millimeter wave transceiver antenna array for transmitting and receiving a first millimeter wave signal, a second millimeter wave transceiver device, which comprises a second millimeter wave transceiver antenna array for transmitting and receiving a second millimeter wave signal, and is configured in opposite direction with relation to the first millimeter wave transceiver device; a connection member for connecting the first millimeter wave transceiver device to the second millimeter wave transceiver device. The apparatus also includes a drive device, which drives one of the first and the second millimeter wave transceiver devices such that the first millimeter wave transceiver device and the second millimeter wave transceiver device move in opposite directions.

U.S. patent application Ser. No. 13/274,683 (published as US 2012/0093289 A1) in the name of American Science and Engineering Inc. entitled "System and Methods For Intrapulse Multi-Energy and Adaptive Multi-Energy X-Ray Cargo Inspection" discloses methods and systems for X-ray inspection of an object using pulses whose spectral composition varies during the course of each pulse. A temporal sequence of pulses of penetrating radiation is generated, each pulse characterized by an onset and by a spectral content that evolves with time Subsequent to the onset. The pulses are formed into a beam that is scanned across the object. The penetrating radiation from the beam that has traversed the object is detected, generating a detector signal. The detector signal is processed to derive at least one material characteristic of the object, such as effective atomic number, on the basis of temporal evolution of the detector signal during the course each pulse of the sequence of pulses. The detector signal is separately acquired for multiple time intervals relative to the pulse onset, and processed to obtain values corresponding to multiple-energy analysis of the trans mitted radiation. The time intervals may be predetermined, or else adapted based on features of the detected signal.

PCT international application number PCT/US2011/028398 (published as WO 2011/115927 A2) in the name of Rapiscan Systems, Inc. entitled "Personnel Screening System" discloses an inspection system for detecting objects being carried by a person who is moving along a pathway. The inspection system has two detection systems configured to detect radiation scattered from the person as the person moves along the pathway and an X-ray source positioned between the detection systems. The X-ray source is configured to generate a vertical beam spot pattern and does not generate beams that move horizontally.

U.S. patent application Ser. No. 12/993,832 (published as US 2011/0142203) in the name of MORTON, Edward James entitled "Gantry Scanner Systems" discloses: A gantry scanner system comprises a radiation source, a plurality of detectors and a support frame supporting the detectors. The support frame includes an elongate support member arranged to support the detectors, cable support means arranged to support power cables or signal cables connected to the detectors, and cover means arranged to cover the support member, the cable support means and the detectors.

U.S. Pat. No. 7,225,338 in the name of KHAN, Sal and LEVINE, Martin D entitled "Secure System for the Identification of Persons Using Remote Searching of Facial Iris and Voice Biometric Templates" discloses a system and method that permits a plurality of clients to remotely search and share biometric information contained in single or a plurality of databases over a local area network, wide area network or public network such as the Internet. The system comprises one or more remote workstations each having a camera and means for converting facial images of persons of interest to biometric templates. A biometric search query may be placed from the remote workstation to one or more searchable databases containing a plurality of biometric templates. The databases are connected to the workstation by communication means through a server that manages data traffic between the remote workstation and the database. A search engine compares the biometric template of the person of interest to those stored on the database(s) and indicates a match according to a predetermined confidence interval. A predetermined number of matches are prioritized in order of similarity to the person of interest and returned to the workstation for review.

U.S. Pat. No. 7,233,004 in the name of Koninklijke Philips Electronics, N.V. entitled "X-Ray Examination Apparatus Including a Dosimeter" discloses an arrangement which includes a radiation source (1) and a radiation sensor device (3) for forming image signals (Bn), the radiation sensor device (3) being associated with a read-out circuit arrangement (4) for the amplification/processing of image signals (Bn) read out, there also being provided at least one dosimeter (42) which is arranged to measure a radiation dose. The invention also relates to an X-ray examination apparatus and to a method for the processing of X-ray images. In order to realize an arrangement and a method whereby a high image quality can be achieved for the acquired images, it is proposed to apply a dose signal (Dn), produced by at least one dosimeter (42), to at least the read-out circuit arrangement (4).

The term "imaging" used throughout this specification (in some cases interchangeably with the term "scanning") refers to the process of using an imaging apparatus to generate an image of an individual (hereinafter referred to as a "subject"). The generated image typically includes or depicts internal structures of the subject.

A commonly used type of imaging apparatus employs electromagnetic radiation in the form of x-rays for generating an image of the subject. Such an imaging apparatus may be referred to as an x-ray apparatus or x-ray scanner and typically includes an energy source (i.e. a source of radiant energy), a detector, and a processing unit (e.g. a computer).

In the case of an imaging apparatus making use of vertical scanning, the energy source and detector are typically spaced apart and disposed on opposing sides of a scanning zone or area, yet are mechanically connected to each other, e.g. using a structural element known as a "C-arm" or "C-shaped arm". In order to generate an image of the subject, the energy source and/or detector and C-arm are displaced relative to the subject in a scanning direction at a specific rate, referred to as the scanning rate, whilst irradiating the subject. In this specification, the term "vertical scanning" refers to cases in which the energy source moves relative to the subject such that an x-ray beam is transmitted in a transverse anatomical plane instead of a sagittal anatomical plane.

An imaging apparatus of the type described above may be used to detect weapons, explosive materials, components of blasting assemblies, narcotics, electronic devices, precious stones or metals, chemical or biological materials in containers, other contraband, and the like, on or inside of the body of a subject. These apparatuses are used extensively in facilities such as prisons, mines, precious stone sorting houses and precious metal refineries, where the monitoring and/or control of goods and substances entering or leaving a designated area is required. Accordingly, these imaging apparatuses are in many cases used as so-called "security scanners".

In many implementations, an imaging apparatus may form part of a larger screening arrangement including, for instance, one or more inspection zones and/or one or more holding rooms. In the context of this specification, the term "screening" is used to refer to a procedure intended to prevent items or goods such as those listed above (i.e. unauthorised items) from entering a designated area. Screening may thus include imaging of subjects, but may also include other procedures.

In some cases, screening is carried out at a boundary between an unscreened area and a screened area (or at some other transition from a high-risk area to a low-risk area). For instance, screening may be carried out at a boundary between a public area of an airport and a so-called "sterile" area of the airport.

When generating an image of a subject for purposes such as those mentioned above, it is desirable to obtain an image of sufficient quality in a relatively short time, while also limiting the amount of radiation the subject is exposed to. In the Inventors' experience, the following variables may have an influence on the amount of radiation the subject is exposed to:

the speed/rate at which the energy source travels relative to the subject in order to complete the scan;
the voltage (typically measured in kV) of an x-ray tube being used;
the current (typically measured in mA) of the x-ray tube being used;
the distance between the x-ray source and the subject; and
the type of x-ray filter used, e.g. copper, stainless steel or other materials.

In some cases, it may be desirable to provide an imaging apparatus with substantially low levels of radiation, relative to Background Equivalent Radiation Time (BERT) levels of 3 mSv per year (which is typically used as a measure of low level radiation exposure), while still producing images of sufficient quality to permit an operator or processor of the imaging apparatus to detect contraband or the like on or inside of the body of the subject. It is also desirable to limit or eliminate peripheral radiation, i.e. radiation outside of a body or housing of the imaging apparatus.

The Inventors have identified a number of problems associated with existing imaging apparatuses and existing screening arrangements which include one or more imaging apparatus.

Firstly, the Inventors have found that known imaging apparatuses may not facilitate an optimal flow of subjects through an imaging area, and therefore also not through a screening arrangement as a whole, where applicable. For instance, certain mechanical connections between the energy source and detector of an imaging apparatus, e.g. a C-arm in the case of vertical scanning, may increase the dimensions of the apparatus and/or may restrict passage of a subject in or through the apparatus. Furthermore, in certain screening arrangements, if a particular subject is identified for further screening, questioning, or the like, the flow of subjects through the screening arrangement may be interrupted, restricted or prevented.

Secondly, in the Inventors' experience, known imaging apparatuses are typically bulky and may cover a large surface area (e.g. they may have a footprint of 4 $m^2$ to 13 $m^2$, or more). Accordingly, installing such apparatuses into existing sites may be a difficult or cumbersome task and, once installed, imaging apparatuses may be difficult to reposition. Furthermore, rapid deployment of such imaging apparatuses (and screening arrangements including these apparatuses) may be difficult to achieve.

Thirdly, the Inventors believe that many existing imaging apparatuses do not provide adequate security features such as positive identification and guaranteed single entry for use in facilities such as airports and prisons.

Fourthly, the inventors believe that many existing imaging apparatuses do not provide adequate safety features such as protection from moving platforms or conveyors.

Some existing imaging apparatus which make use of moving platforms or conveyers to convey a subject through the imaging area operate at around 9 seconds scan time per scan due to the fact that it may become unsafe to move the subject on the conveyor through the imaging area faster.

Existing imaging apparatuses may require civil, mechanical, electrical and/or instrumentational contractors to provide optional additional functionality, e.g. the construction of entry cubicles (mantrap) for subjects entering and holding rooms for subjects exiting the imaging apparatus or additional security features.

Furthermore, in the Inventors' experience, some imaging apparatuses may cause excessive peripheral or scatter radiation, which may have adverse effects on individuals in the vicinity of the apparatus.

Embodiments of the present invention aim to address one or more of the issues identified above, at least to some extent.

SUMMARY OF THE INVENTION

In accordance with a first aspect of the invention, there is provided an imaging apparatus for generating an image of a subject, the imaging apparatus comprising:
a scanning arrangement which includes an energy emitting source and a detector;

a housing which houses the scanning arrangement, and which defines an internal scanning zone or area in which the subject is operatively positioned for scanning by the scanning arrangement;

a displacing arrangement which serves operatively to interconnect the energy emitting source and detector and is housed within the housing and is configured to displace the scanning arrangement relative to the housing in a scanning direction in order to scan the subject in the scanning zone;

a first door which, when open, defines a first opening in the housing; and a second door which, when open, defines a second opening in the housing, wherein the first door and the second door are arranged at or near opposing ends or sides of the housing so as to define a substantially linear path between them, such that, in use, the subject travels in a substantially straight line along the linear path by entering the scanning zone via one of the openings in the housing and exiting the scanning zone via the other one of the openings in the housing; and wherein at least part of the displacing arrangement operatively connecting the energy emitting source and detector together is not disposed in the scanning zone and is not itself displaced relative to the housing in the scanning direction in which the energy emitting source and detector are displaced during scanning such that the displacing arrangement does not restrict or impede movement of the subject through the scanning zone.

The part of the displacing arrangement connecting the energy emitting source and detector together may be disposed above or below the scanning zone.

The displacing arrangement may include a belt-and-pulley drive arrangement which includes first and second drive belts drivingly connected to pulleys in a U-shaped configuration around the scanning zone and a motor drivingly connected to the first drive belts. The motor and a pair of the first drive belts of the belt-and-pulley drive arrangement, which serve to connect the energy emitting source and detector together, may be disposed above or below the scanning zone.

The second drive belts of the belt-and-pulley drive arrangement of the displacing arrangement may be configured to displace the scanning arrangement along a vertical axis of the imaging apparatus in the scanning direction. To this end, the first drive belts may be horizontal drive belts and the second drive belts may be vertical drive belts. The first or horizontal drive belts of the belt-and-pulley drive arrangement of the displacing arrangement may extend laterally from one side of the housing to the other. A total displacement time or scan time of less than 5 seconds over 2000 mm travel is considered attainable, practical and safe. In the prior art conveyor configurations, the displacement time or scan time is limited to a safe speed of around 9 seconds for moving a subject on the platform or conveyer.

The imaging apparatus may be devoid of a C-shaped arm mechanically connecting the energy emitting source and detector together.

The displacing arrangement may be configured collinearly to displace the energy emitting source and the detector relative to the housing.

The energy emitting source may be secured to a set of transversely spaced apart, vertically extending drive belts on one side of the scanning zone whilst the detector may be secured to another opposing set of transversely spaced apart, vertically extending drive belts on the other side of the scanning zone. A lower set of pulleys and an upper set of pulleys, on each side of the scanning zone, may be drivingly connected by transversely extending shafts.

The motor may be located either below or above the scanning zone and may be drivingly connected to either sets of pulleys via the pair of horizontal drive belts to ensure simultaneous upward or downward displacement of the energy emitting source and detector relative to the housing. Each of the source and detector may be secured to the set of vertical drive belts by way of an attachment formation. The attachment formation may clamp onto the respective vertical drive belts at the same height and side thereof. As the horizontal drive belts are displaced by the motor, the horizontal drive belts displace the vertical drive belts and the scanning arrangement may rise or fall together with one side of the vertical drive belts. A linear bearing may be provided in each corner, adjacent to each vertical drive belt. The energy emitting source and detector may both have a pair of linear bearing followers which operatively slide up and down along the linear bearings to ensure linear movement of the scanning arrangement.

The imaging apparatus may include an image generating unit configured to generate the image of the subject. The image generating unit may be interfaced to the detector and to a processor.

The housing may have a substantially rectangularly cuboidal shape. The housing may define a front, a rear and two sides of the imaging apparatus. The first door may be located at the front of the imaging apparatus and the second door may be located at the rear of the imaging apparatus such that the subject travels substantially in a straight line through the imaging apparatus as part of a screening process.

The imaging apparatus may be configured to be positioned at a boundary between an unscreened area and a screened area such that, in use, the subject is required to travel through the scanning zone in order to move from the unscreened area to the screened area.

The housing and doors may be configured substantially to seal off internal components of the imaging apparatus from an external environment when the doors are closed, the housing and doors being configured to create an air lock in the scanning zone.

The imaging apparatus may include an interlock unit which is communicatively coupled to a locking mechanism and a position sensor or switch associated with each door. The interlock unit may be configured to provide a hard interlock. The interlock unit may be configured to designate both doors as normally locked, the interlock unit further being configured to transmit an unlocking signal to the locking mechanism of one of the doors in response to identification of the subject. The interlock unit may be configured to transmit locking signals to the locking mechanism of both doors when scanning is in progress. The interlock unit may be configured to retain at least one of the doors in a locked condition at all times.

The linear path may be bidirectional such that the first door defines either an entrance opening or an exit opening.

The imaging apparatus may include one or more biometric or proximity type readers for identification of the subject.

The imaging apparatus may be configured to employ dual energy scanning in combination with time domain integration (TDI) to improve image quality and to reduce the amount of radiation required to produce a high quality image.

The imaging apparatus may have a footprint of less than 2 square meters.

The energy emitting source and the detector may be positioned on opposing sides of the imaging apparatus. The energy emitting source may be configured to emit a beam of x-rays in a transverse anatomical plane of the subject.

The detector may be configured to permit matter differentiation for imaging purposes by means of binning, thereby allowing the imaging apparatus to distinguish between matter with different atomic numbers.

The imaging apparatus may include an Uninterrupted Power Supply (UPS) which is communicatively coupled to the processor such that the processor is capable of monitoring a power level associated with the UPS. Imaging of a subject may only be commenced if the processor determines that sufficient power is available to complete imaging of the subject and/or to prevent damage to the imaging apparatus should an input power supply, e.g. mains power supply, to the imaging apparatus be disconnected or interrupted.

The imaging apparatus may be configured to identify a subject being scanned for a first time and to assign a unique identifier to the subject, the imaging apparatus being configured to communicate data associated with the unique identifier to a remote server or database, and/or to receive data from the remote server or database.

The imaging apparatus may include an integrated dose meter which is configured to communicate data to the processor.

The imaging apparatus may include a display which is configured to display the image to an operator before receiving user input indicating a selected region of the image. The imaging apparatus may be configured, in response to receiving the user input, to rescan the selected region using the scanning arrangement.

The imaging apparatus may be configured to rescan the selected region using optimised scanning parameters.

Rescanning may be carried out at a lower scanning speed than a scanning speed at which the selected region was previously scanned and/or at a different voltage/current from a voltage/current used when the selected region was previously scanned and/or using a different x-ray filter from an x-ray filter previously used to scan the selected region and/or using a different distance between the energy emitting source and the subject from a distance used when the selected region was previously scanned.

The imaging apparatus may be configured to display the rescanned image to the operator.

The invention extends to a screening kit comprising:
an imaging apparatus as described above; and
a holding room attached to or integral with the imaging apparatus, wherein one of the doors of the imaging apparatus leads into an entrance to the holding room.

The screening kit may comprise a container, wherein the imaging apparatus and the holding room are integral with the container such that at least one wall of the container defines at least one wall of the holding room.

The invention also extends to a method of screening a subject, the method comprising the steps of:
providing an imaging apparatus as described above; and
directing movement of the subject such that the subject travels in a substantially straight line along the substantially linear path by entering the scanning zone of the imaging apparatus via one of the openings in the housing of the imaging apparatus for scanning by the scanning arrangement and exiting the scanning zone via the other one of the openings in the housing.

The imaging apparatus may be configured to be positioned at a boundary between a non-secure area and a secure area. In some embodiments, the imaging apparatus may be configured such that, in use, the subject is required to travel through the scanning zone in order to move from the non-secure area to the secure area.

The imaging apparatus may be configured to be positioned at a boundary between an unscreened area and a screened area. In some embodiments, the imaging apparatus may be configured such that, in use, the subject is required to travel through the scanning zone in order to move from the unscreened area to the screened area. The apparatus may be employed bidirectionally.

The imaging apparatus may include a visual or audible indicator configured to indicate a status of one or both doors, e.g. "open" or "closed", and/or a status of the scanning zone, e.g. "occupied" or "available".

In some embodiments, the imaging apparatus may be configured such that the linear path is unidirectional. In such cases, the first door may define an entrance opening and the second door may define an exit opening.

The first door and the second door may form part of the housing. The doors may be hingedly connected to the housing.

The housing may be shaped and dimensioned such that the subject is scanned while standing upright in the scanning zone. The housing may be provided with intercoms, analytical cameras, security cameras and/or motion sensors.

In some embodiments, the housing may have a length dimension of in the region of 1300 mm to 1800 mm, a width dimension of in the region of 900 mm to 1100 mm and a height dimension of in the region of 2200 mm to 2600 mm.

The energy emitting source may be a source of electromagnetic radiation, e.g. x-rays. The energy emitting source may be configured to emit a beam of x-rays. The energy emitting source may be configured to transmit the x-ray beam in a transverse anatomical plane of the subject.

The imaging apparatus may include an x-ray image intensifier (XRII).

The detector may include a detector array.

The detector may, for instance, be a detector of the type including a scintillator material, such as caesium iodide (CsI), CsI:Ti, Gadolinium Oxysulfate (GdOS), Gadox, Gadolinium oxysulphide (GOS), cadmium zinc telluride (CZT), rare earth dopants-Terbium (Tb), Praseodymium (Pr), Europium (Eu) also known as GT, GPr, GE respectively and at least one photodiode array.

In some embodiments, the scanning arrangement may be provided by a magnetic resonance imaging arrangement, a positron emission tomography (PET) arrangement or a single-photon emission computed tomography (SPECT) arrangement.

The obtaining unit and/or the control unit and/or the image generating unit may be interfaced to a processor. The processor may be a host computer associated with or forming part of the imaging apparatus.

The scanning arrangement may be configured to move relative to the subject in order to irradiate the subject. The scanning arrangement may be configured to be displaced operatively vertically upwardly and downwardly.

The displacing arrangement may include any suitable displacing mechanism, such as a belt-and-pulley drive arrangement, a chain-and-sprocket arrangement, a gear motor drive arrangement or a worm drive arrangement.

The energy emitting source and the detector may be positioned on opposing sides of the imaging apparatus. The imaging apparatus may be devoid of a C-arm connecting the energy emitting source to the detector.

The imaging apparatus may be configured to identify that the subject is being scanned for a first time and to assign a unique identifier to the subject. The identifier may be a biometric identifier. The imaging apparatus may be configured to identify that the subject has been scanned previously and to obtain a unique identifier associated with the subject. The imaging apparatus may be configured to communicate data associated with the unique identifier to a remote server or database, and/or to receive such data from the remote server or database.

In accordance with another aspect of the invention, there is provided a screening arrangement comprising at least one imaging apparatus substantially as described above, wherein the imaging apparatus is positioned at a boundary between a non-secure area and a secure area.

In accordance with another aspect of the invention, there is provided a screening arrangement comprising at least one imaging apparatus substantially as described above, wherein the imaging apparatus is positioned at a boundary between an unscreened area and a screened area.

The imaging apparatus may be positioned such that a subject is required to travel through the scanning zone of the imaging apparatus in order to move from:
the unscreened area to the screened area.

The holding room may be a modular holding room.

The screening arrangement may include a plurality of holding rooms.

The screening arrangement may include a primary holding room and one or more secondary holding rooms. The substantially linear path which includes entering the scanning zone via one of the openings in the housing and exiting the scanning zone via the other one of the openings in the housing may include entering and exiting the primary holding room. The secondary holding rooms may be arranged in parallel with the primary holding room, relative to the linear path.

The screening arrangement may include a plurality of the imaging apparatuses.

The screening arrangement may be positioned at a boundary between a high-risk area and a low-risk area, at a boundary between a non-secure area and a secure area, or at a boundary between an unscreened area and a screened area.

At least one holding room substantially as described above may form part of the imaging apparatus (i.e. may be integral with or attached thereto) and the method may include the step of directing movement of the subject into and/or through the holding room after the subject has exited the scanning zone of the imaging apparatus.

In accordance with a further aspect of the invention, there is provided a container unit which includes a container and an imaging apparatus substantially as described above fixedly positioned in the container.

The container may be a movable container. The container may have a generally rectangularly cuboidal shape. The container unit may include one or more holding room substantially as described above which is integral with the container such that at least one wall of the container defines at least one wall of the holding room.

In accordance with a further aspect of the invention, there is provided a method of manufacturing a container unit, the method comprising the steps of:
providing a container; and
manufacturing or fixing an imaging apparatus substantially as described above in the container such that the container and the imaging apparatus form the container unit.

The method may further comprise the step of manufacturing or fixing one or more holding room substantially as described above in the container such that it forms part of the container unit, wherein the holding room is integral with the container such that at least one wall of the container defines at least one wall of the holding room.

BRIEF DESCRIPTION OF THE DRAWINGS

The invention will now be further described, by way of example, with reference to the accompanying conceptual drawings.

In the drawings.

DETAILED DESCRIPTION WITH REFERENCE TO THE DRAWINGS

Figure 1:
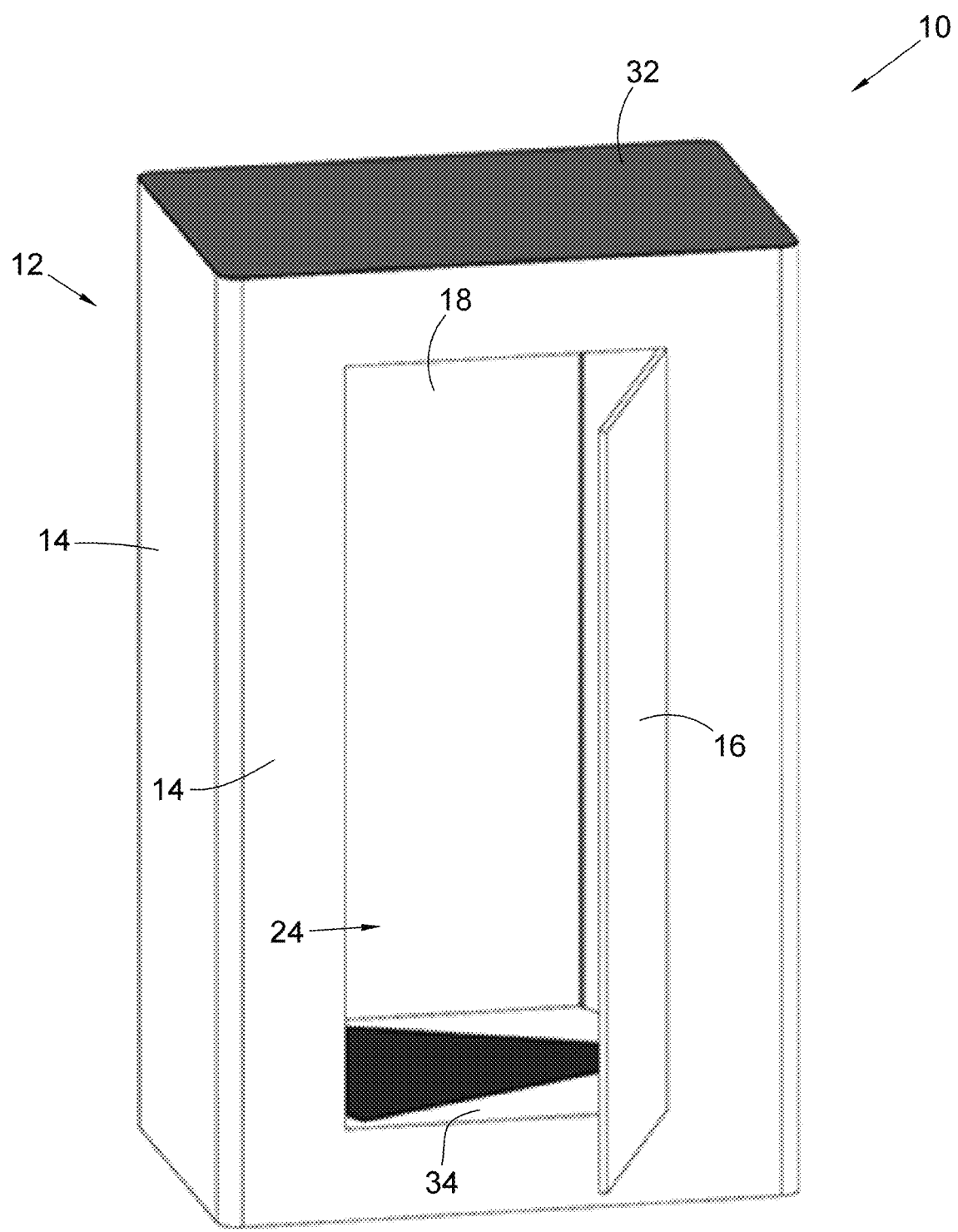
FIG. 1 shows a three-dimensional view of an embodiment of an imaging apparatus according to the invention.
Figure 2:
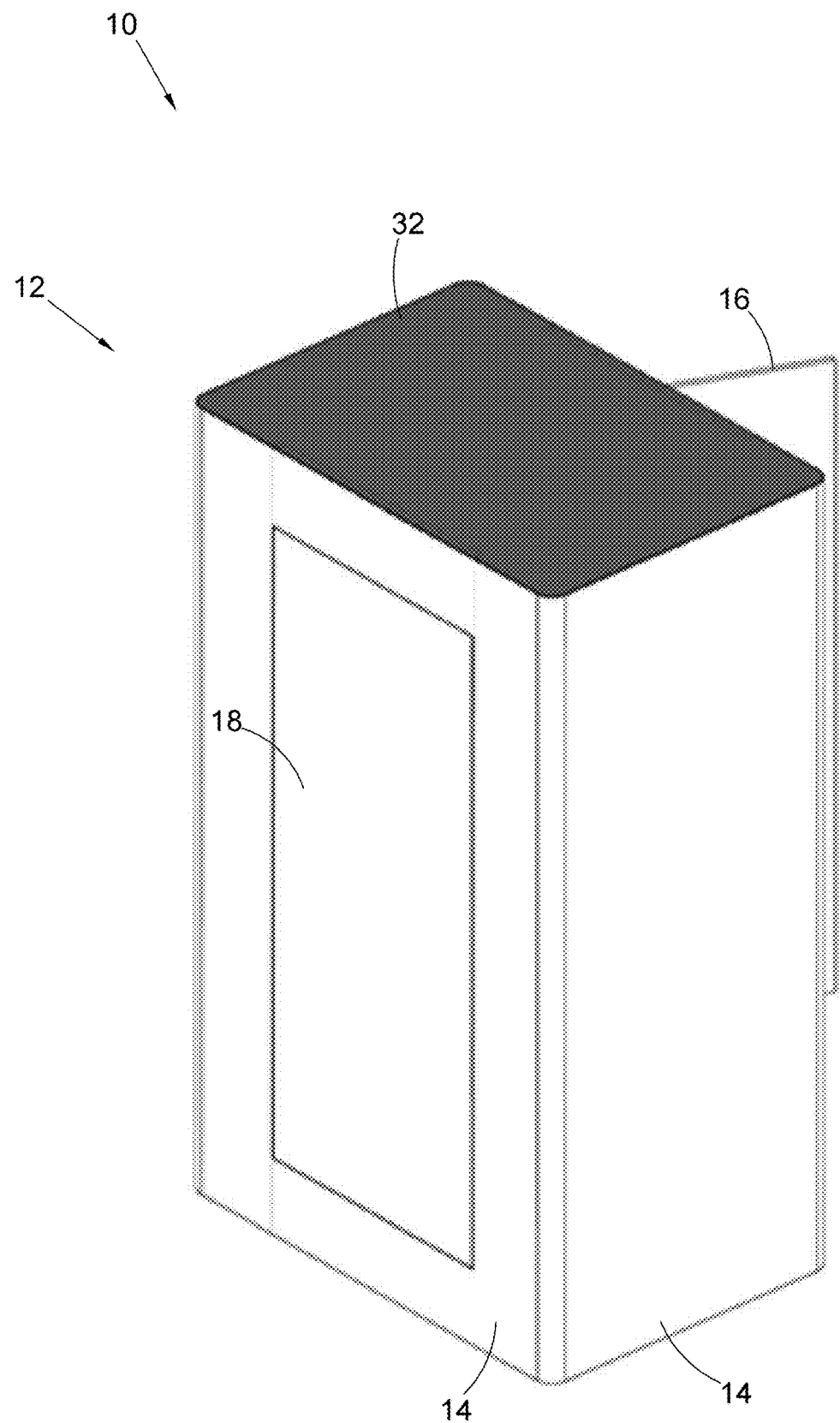
FIG. 2 shows another three-dimensional view of the imaging apparatus of FIG. 1.

The following description of the invention is provided as an enabling teaching of the invention. Those skilled in the relevant art will recognise that many changes can be made to the embodiments described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

An embodiment of an imaging apparatus (hereinafter referred to as "the apparatus") according to the invention is shown in FIGS. 1 to 18 and is generally indicated by reference numeral 10. The apparatus 10 is configured to generate an image of a subject by way of electromagnetic radiation in the form of x-rays.

The apparatus 10 includes a housing 12 which is shaped and dimensioned to define an internal scanning zone or area 24 therein and to house a number of internal components of the apparatus 10, including a scanning arrangement and a displacing arrangement, as described below. The housing 12 is specifically configured to absorb x-rays and to permit individuals to stand next to the apparatus 10 safely during operation (i.e. while a subject is being scanned inside the housing 12).

Figure 3:
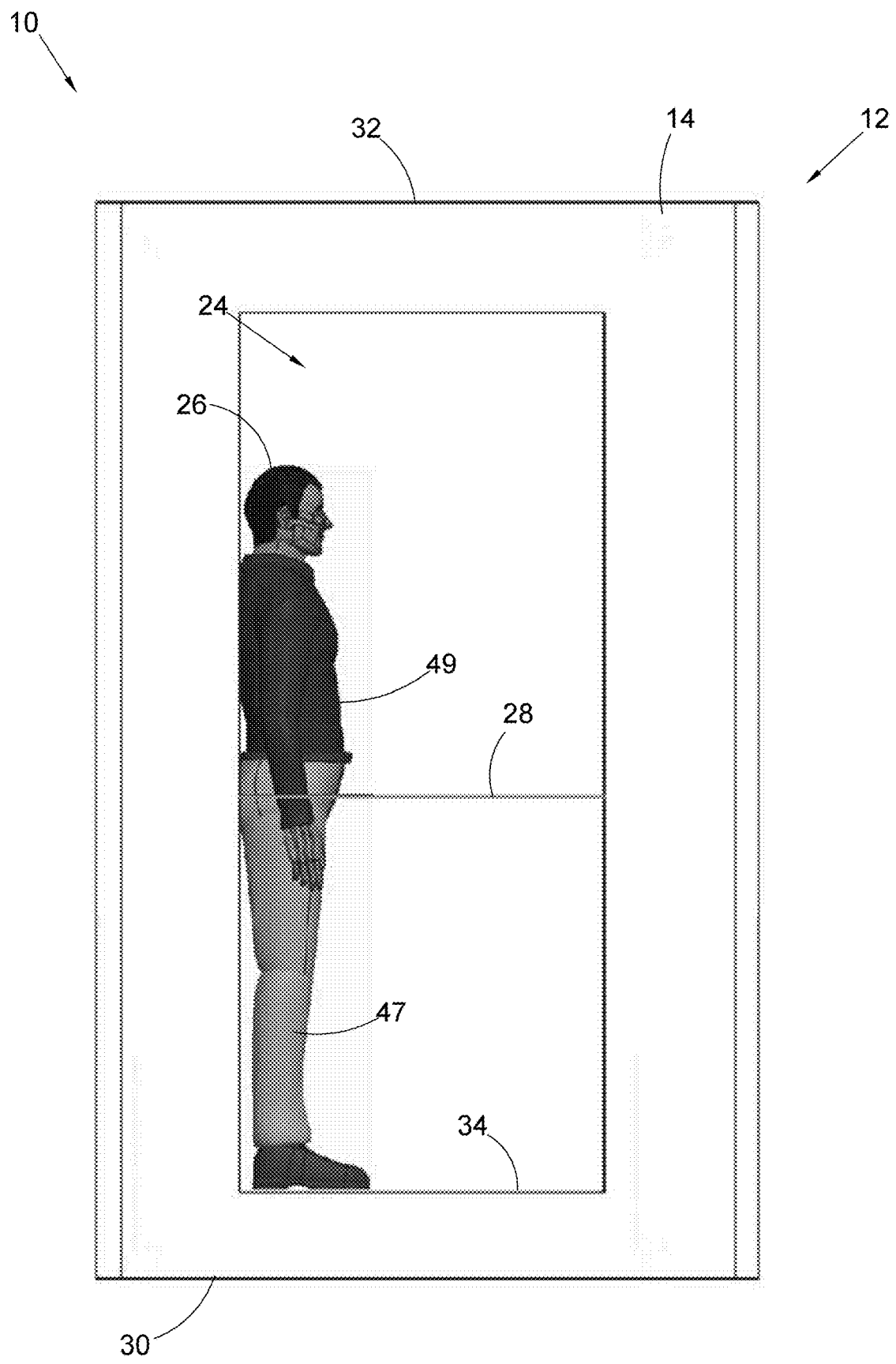
FIG. 3 shows a front view of the imaging apparatus of FIG. 1, illustrating a subject standing in the imaging apparatus.
Figure 4:
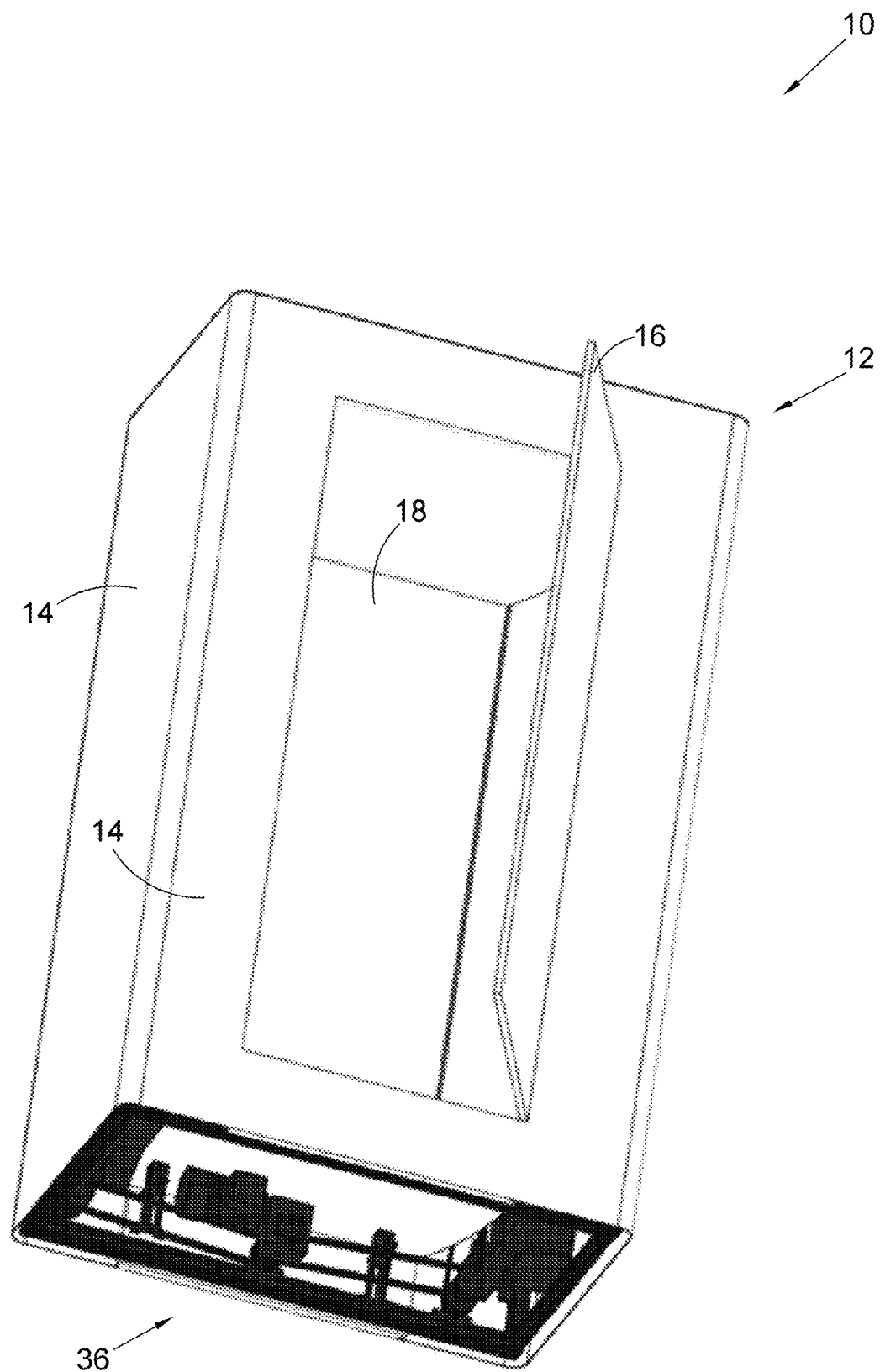
FIG. 4 shows another three-dimensional view of the imaging apparatus of FIG. 1, illustrating a portion of a displacing arrangement of the imaging apparatus.
Figure 5:
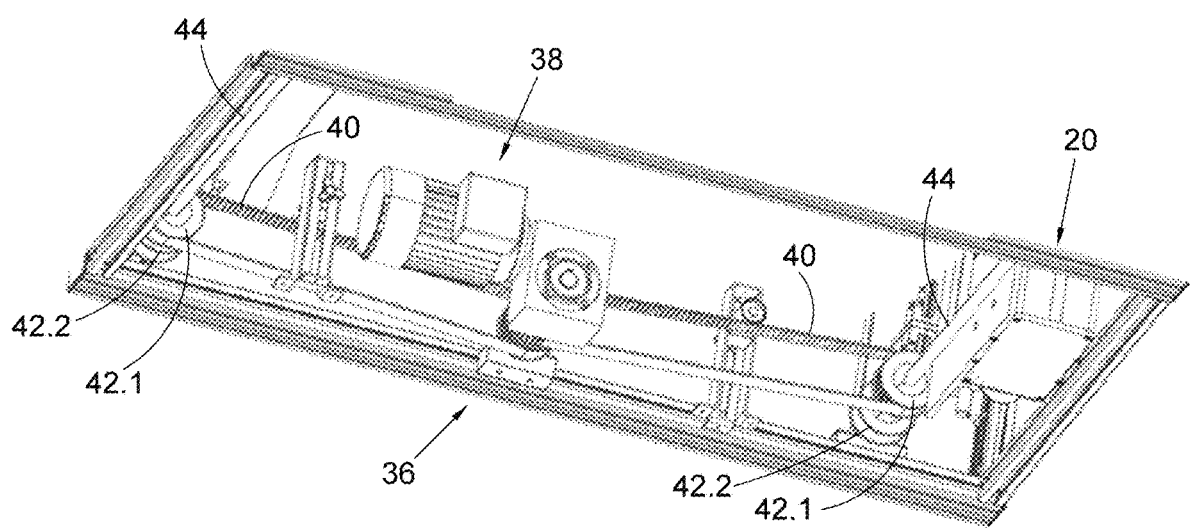
FIG. 5 shows a more detailed three-dimensional view of the portion of the displacing arrangement illustrated in FIG. 4.
Figure 6:
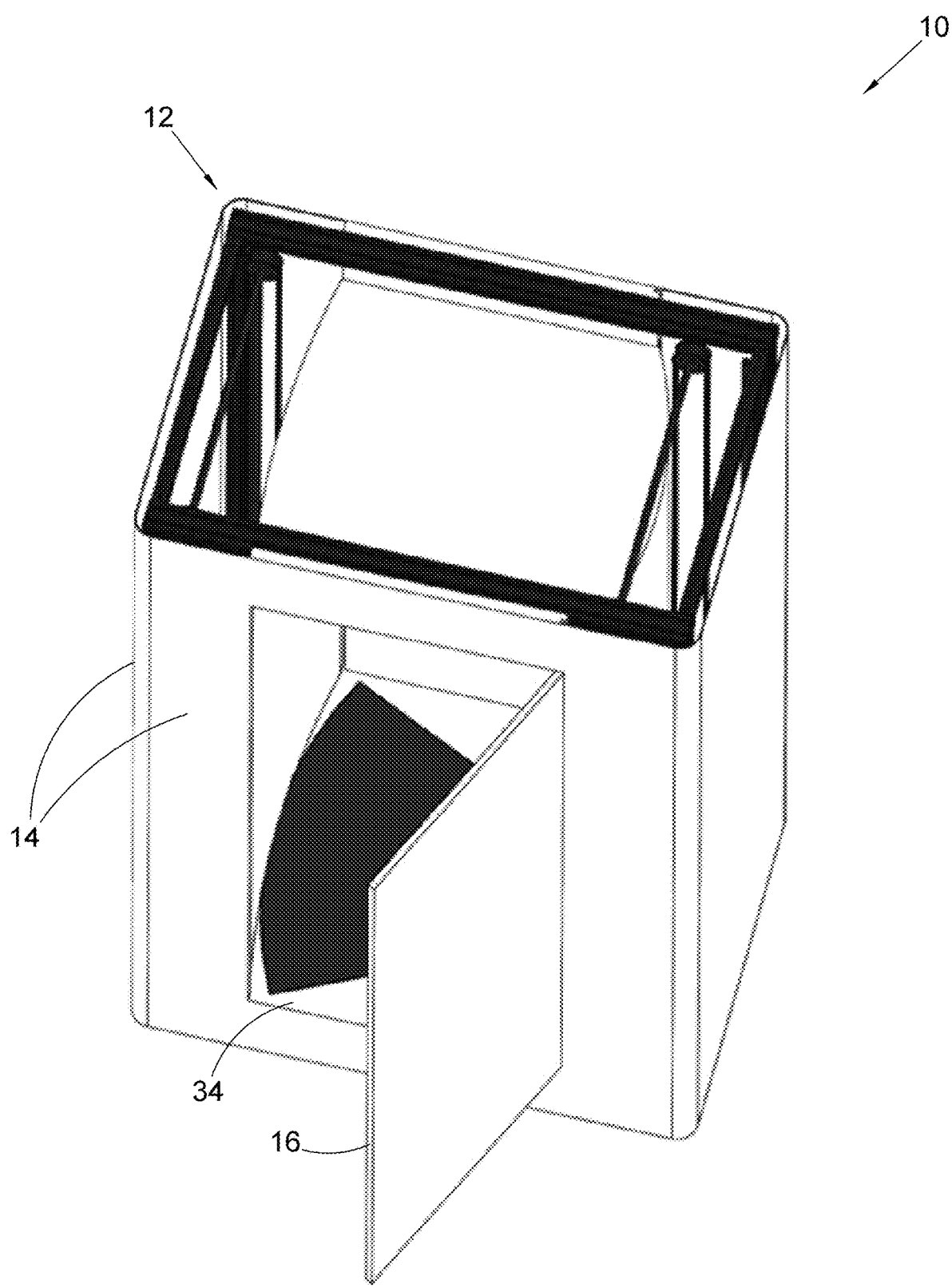
FIG. 6 shows another three-dimensional view of the imaging apparatus of FIG. 1, illustrating a further portion of the displacing arrangement of the imaging apparatus.
Figure 7:
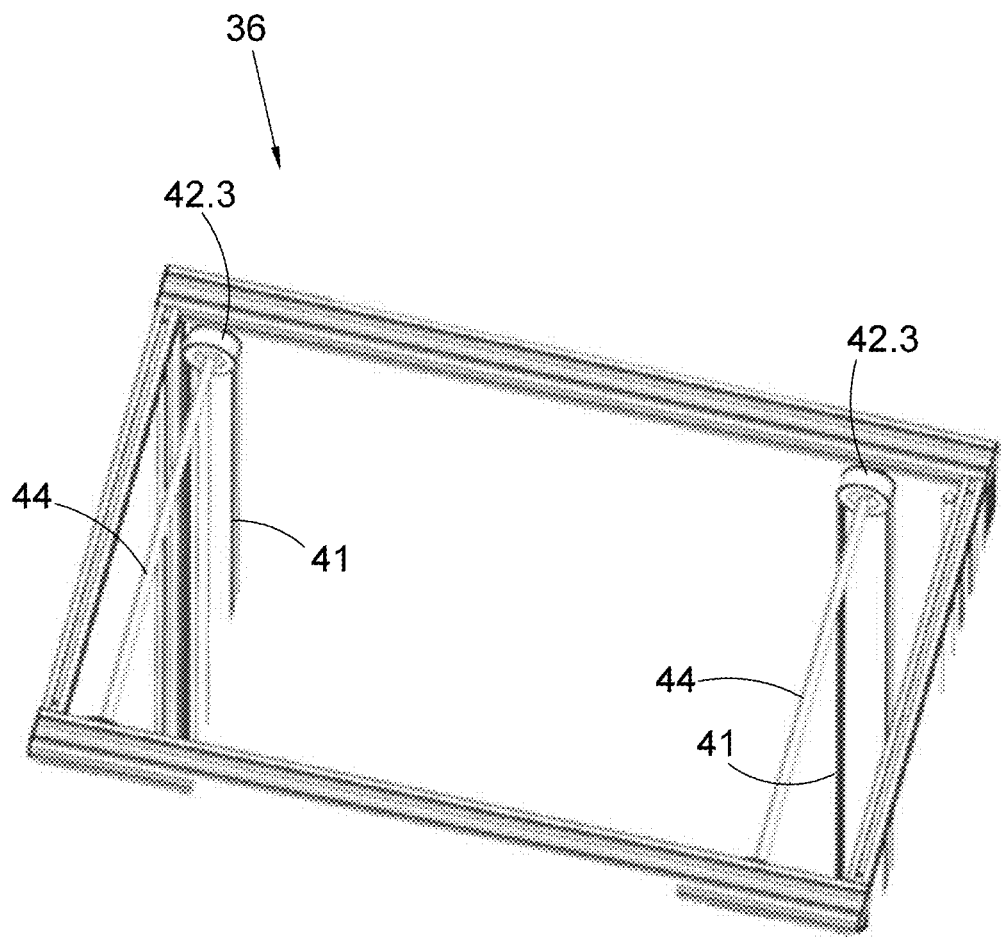
FIG. 7 shows a more detailed three-dimensional view of the portion of the displacing arrangement illustrated in FIG. 6.
Figure 8:
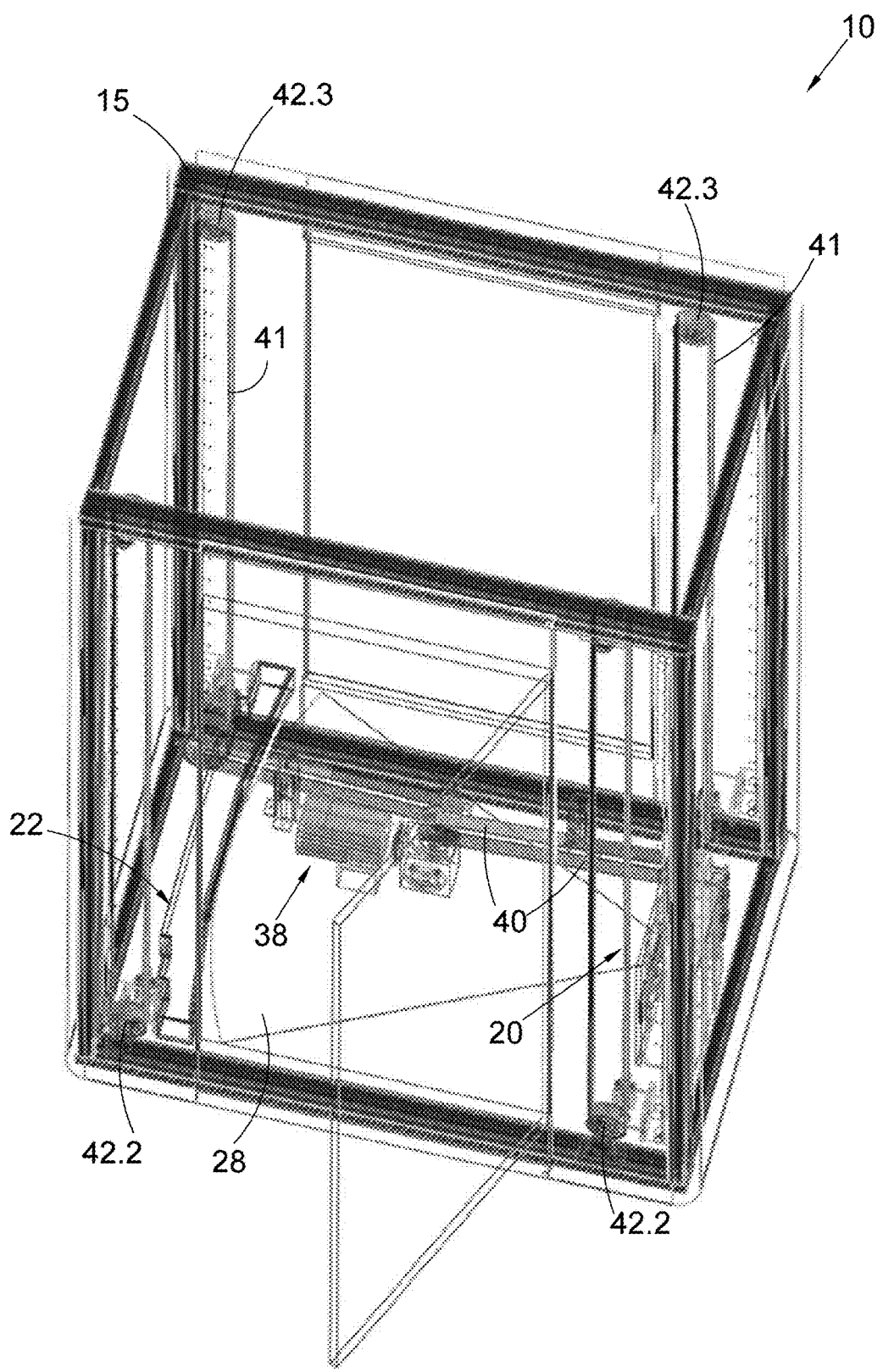
FIG. 8 shows another three-dimensional view of the imaging apparatus of FIG. 1, wherein housing panels and plates of the imaging apparatus are not shown in order to make internal components of the imaging apparatus visible.
Figure 9:
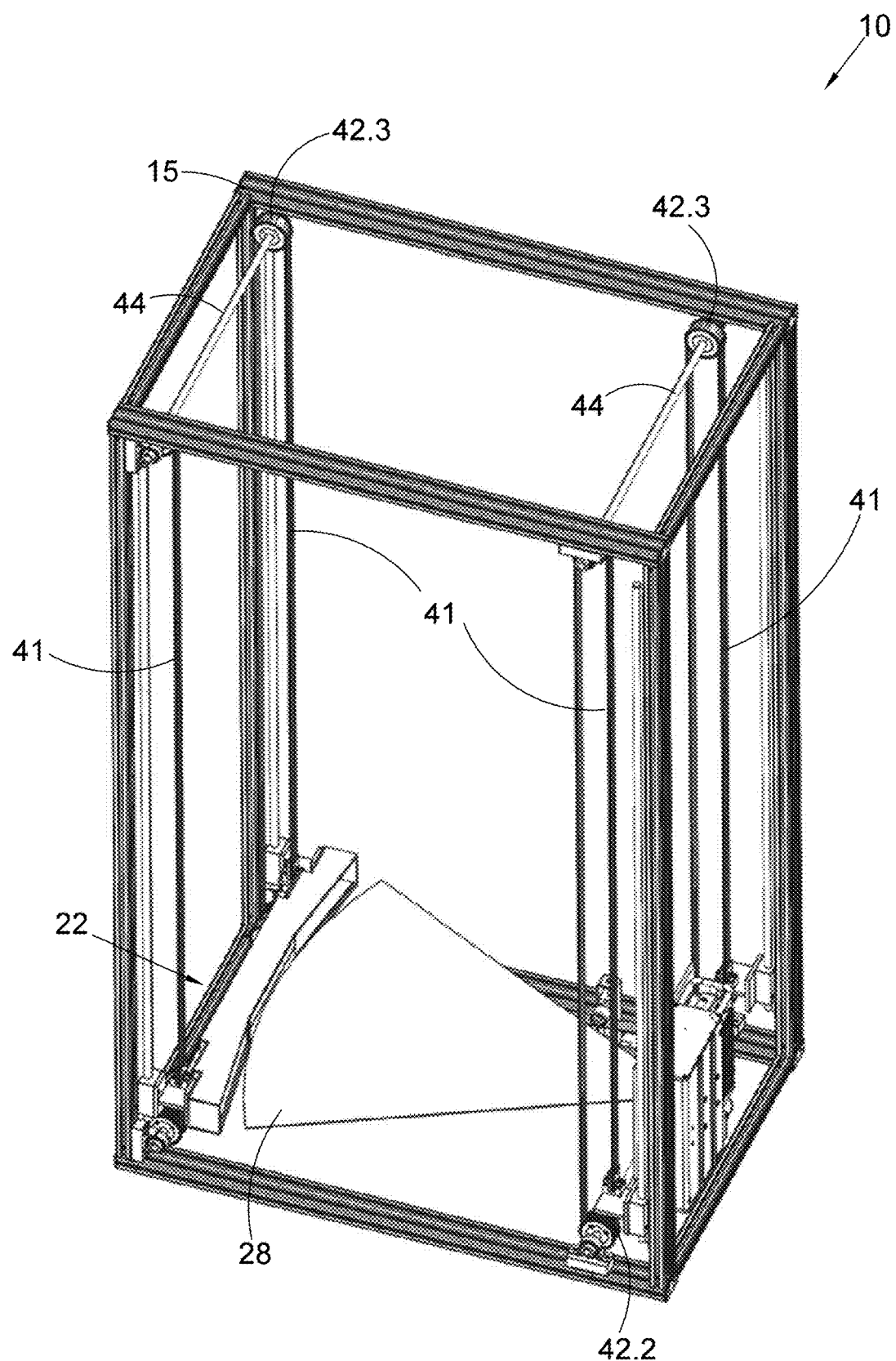
FIG. 9 shows another three-dimensional view of the imaging apparatus of FIG. 1, wherein the housing panels and plates of the imaging apparatus are not shown.
Figure 10:
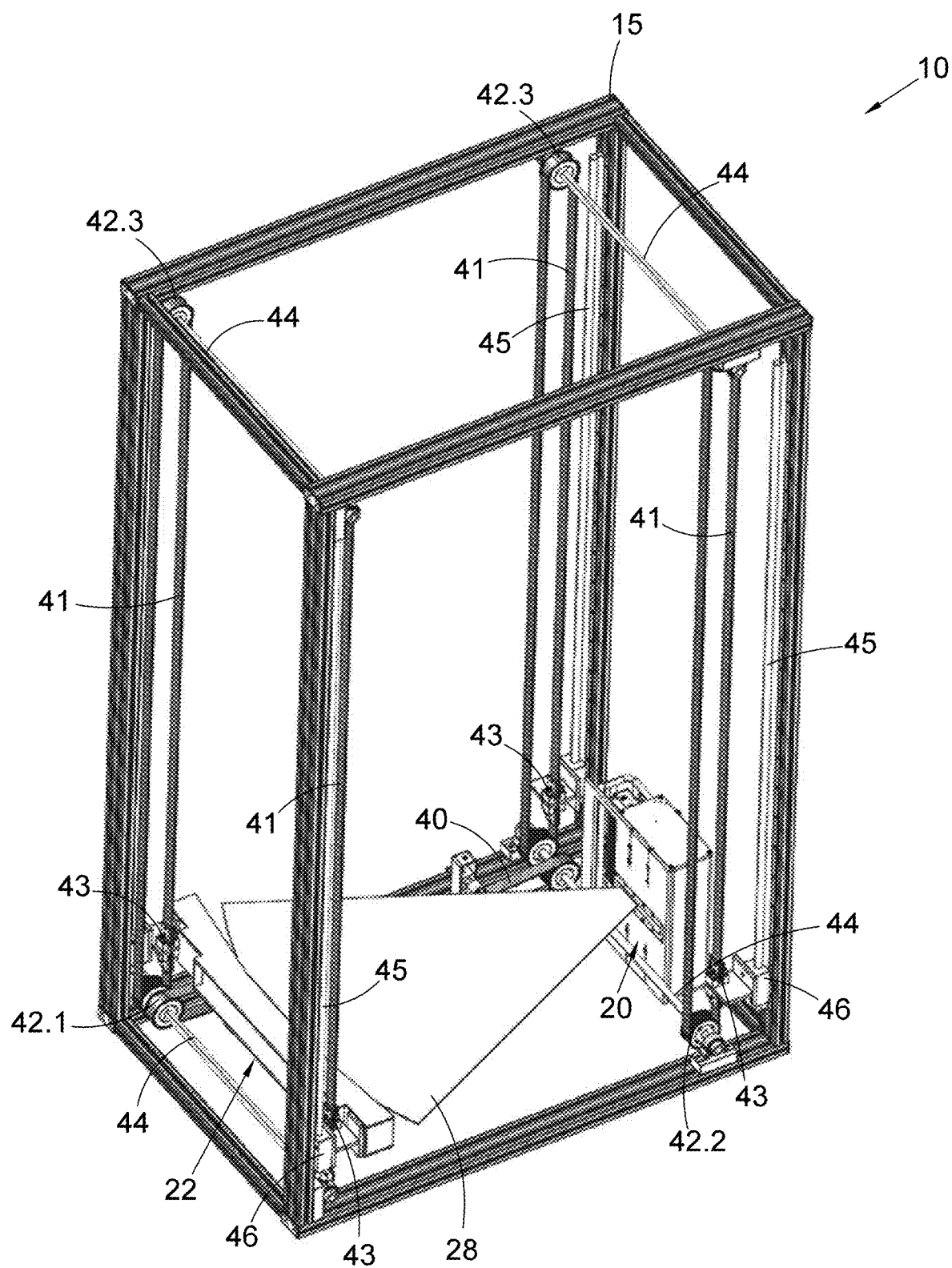
FIG. 10 shows another three-dimensional view of the imaging apparatus of FIG. 1, wherein the housing panels and plates of the imaging apparatus are not shown.
Figure 11:
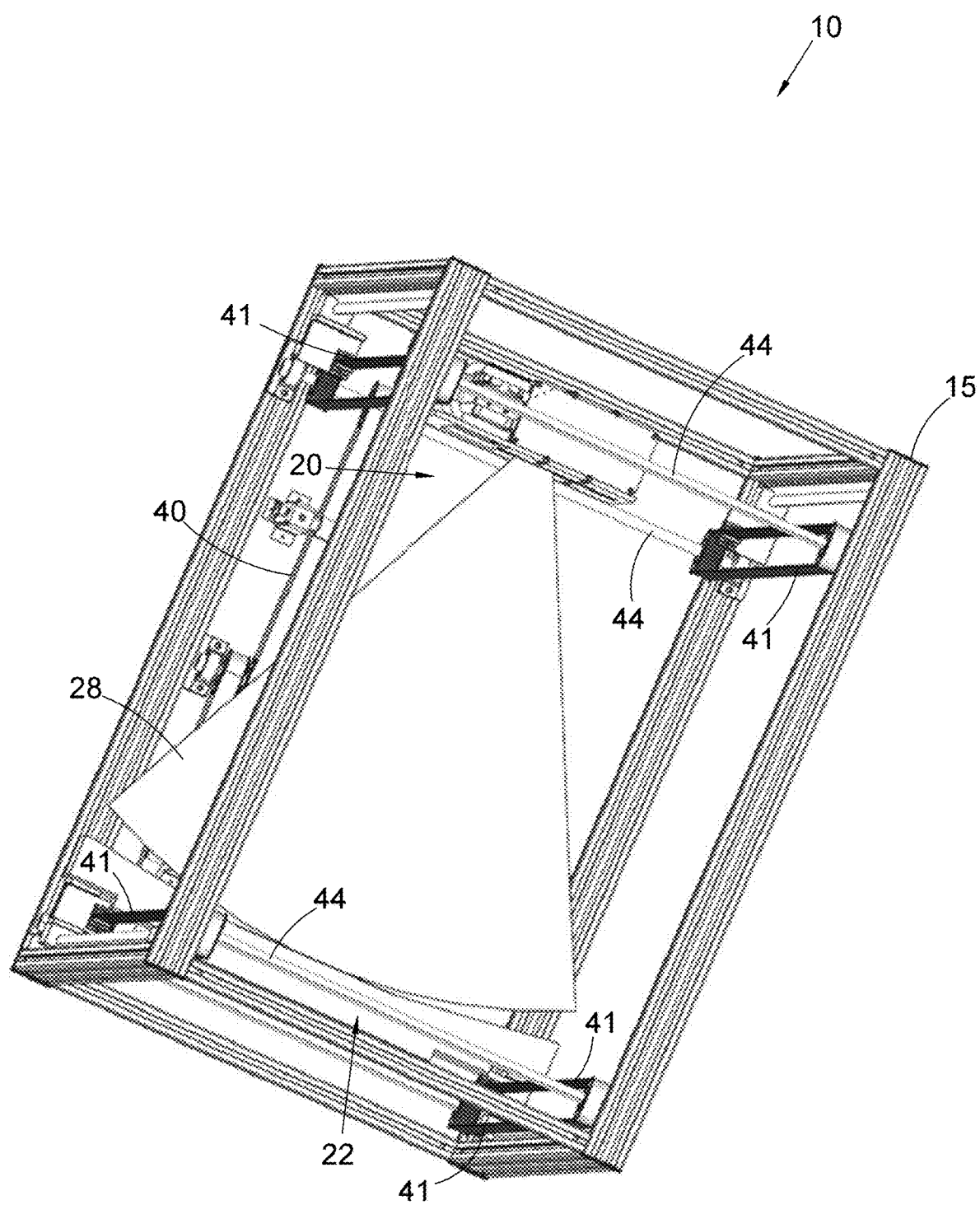
FIG. 11 shows another three-dimensional view of the imaging apparatus of FIG. 1, wherein the housing panels and plates of the imaging apparatus are not shown.
Figure 12:
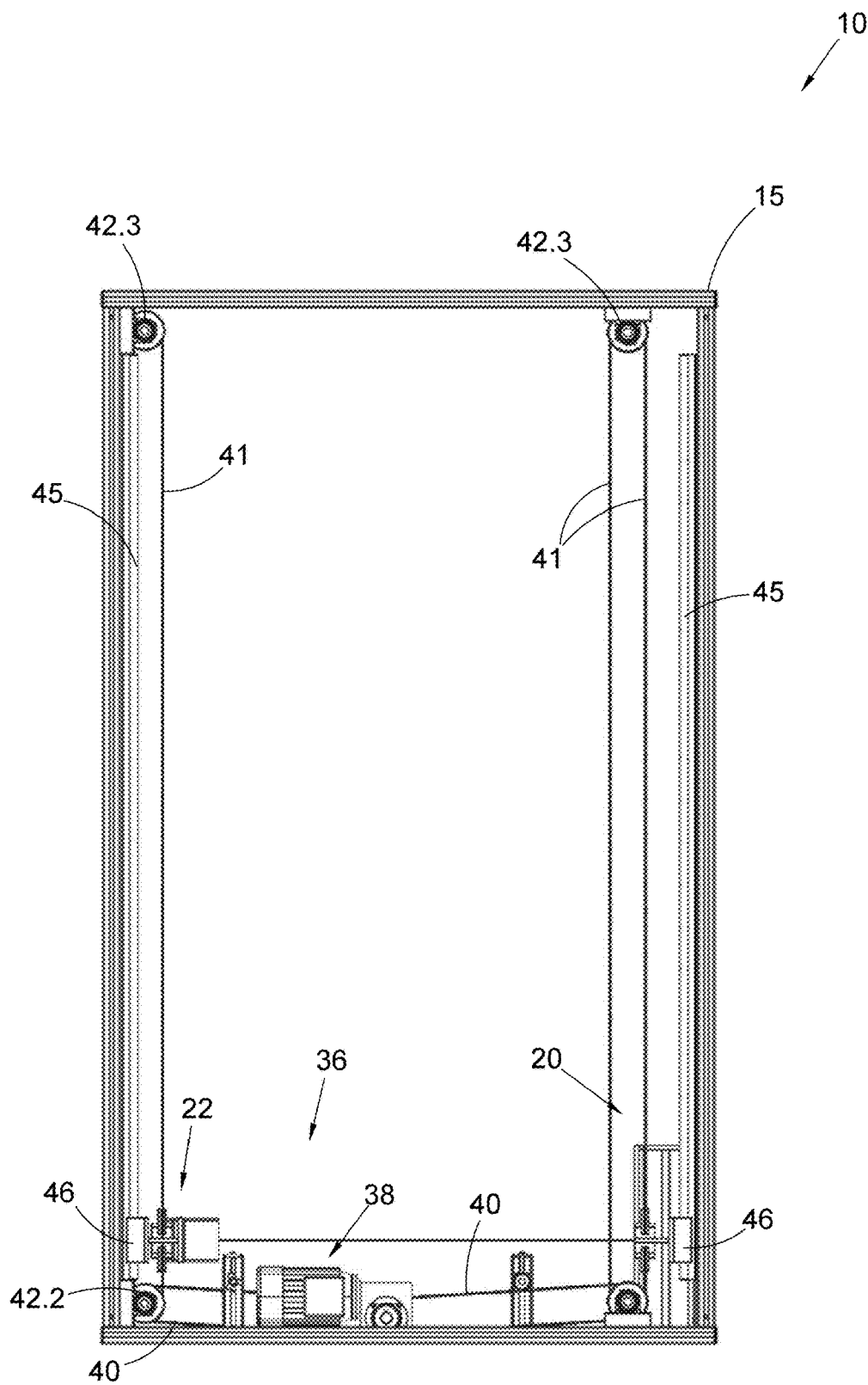
FIG. 12 shows another front view of the imaging apparatus of FIG. 1, wherein the housing panels and plates of the imaging apparatus are not shown.
Figure 13:
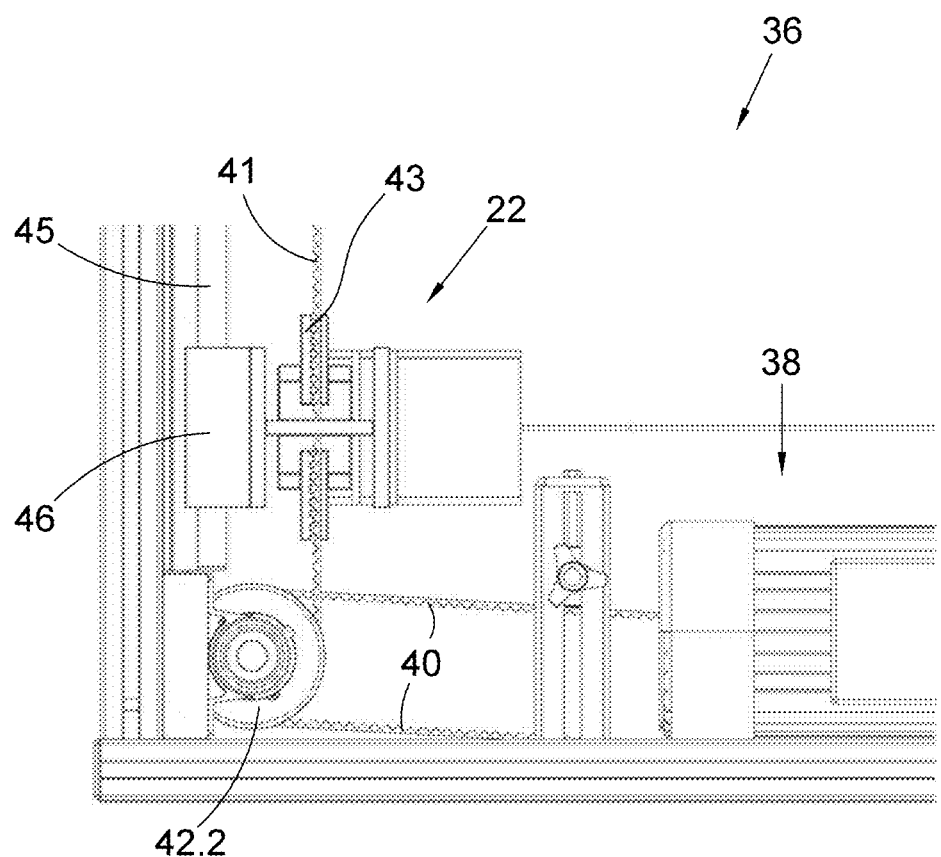
FIG. 13 shows a front view of a portion of the displacing arrangement of the imaging apparatus of FIG. 1.
Figure 14:
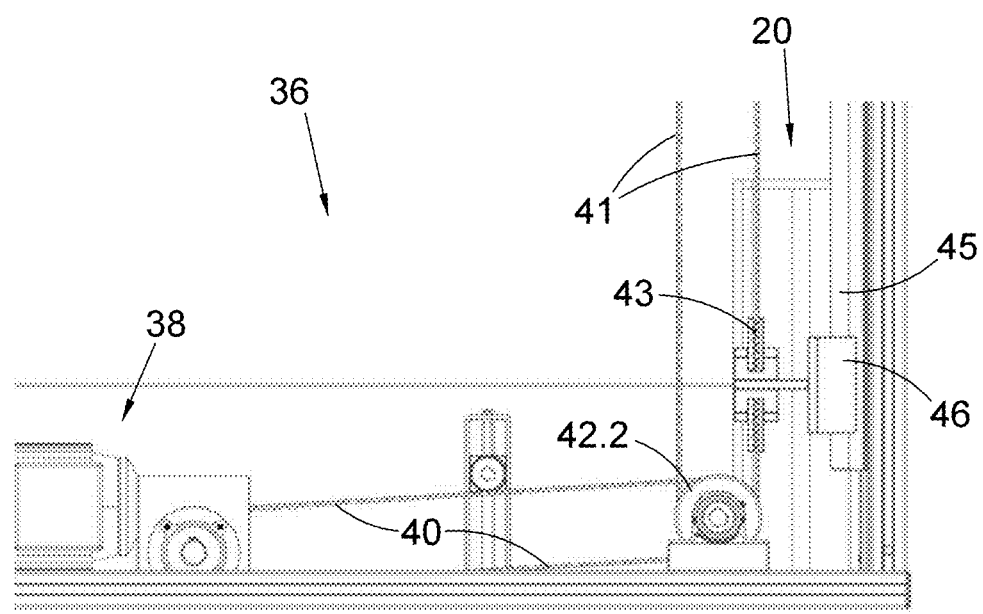
FIG. 14 shows a front view of a further portion of the displacing arrangement of the imaging apparatus of FIG. 1.
Figure 15:
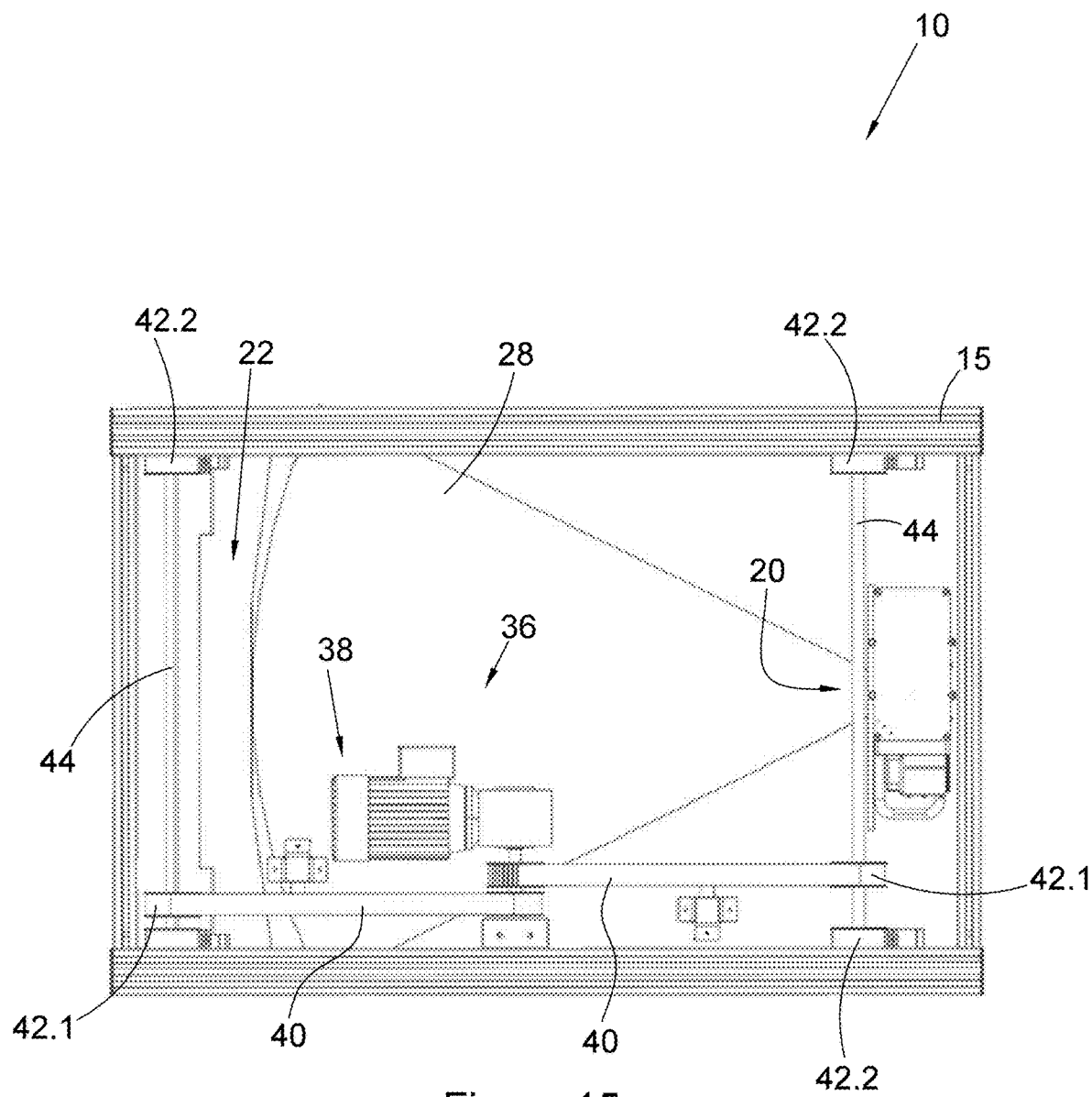
FIG. 15 shows a bottom view of the imaging apparatus of FIG. 1, wherein the housing panels and plates of the imaging apparatus are not shown.
Figure 16:
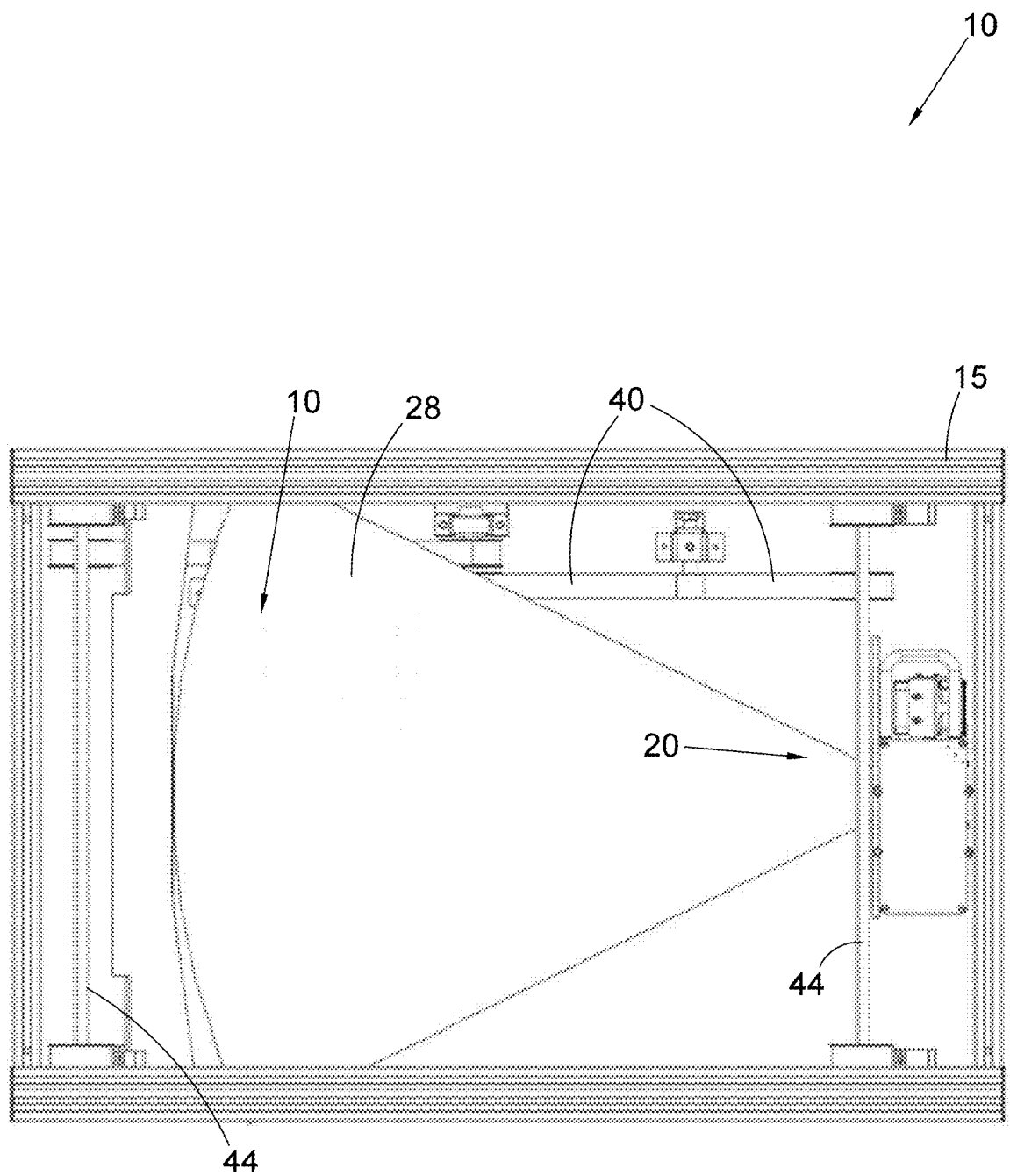
FIG. 16 shows a top view of the imaging apparatus of FIG. 1, wherein the housing panels and plates of the imaging apparatus are not shown.

The housing 12 is provided by a plurality of outer panels 14, a base plate 30 and a top plate 32 which are mounted to a frame 15, with a front door 16 and a rear door 18 provided in two of the panels 14 (i.e. a front panel and a rear panel). The housing 12 also defines a platform 34 on which a subject 26 is positioned in the housing 12, in use, as shown in FIG. 3.

The housing 12 is generally rectangularly cuboidal (when the doors 16, 18 are closed) and, in this specific example, has dimensions of 1691 mm×1021 mm×2467 mm. In this example, the apparatus 10 thus has a footprint of approximately 1.73 m$^2$.

The front door 16 is hingedly connected to a front panel 14 and, when open, defines a first opening in the housing 12, as shown in FIG. 1. The rear door 18 is hingedly connected to a rear panel 14 and, when open, defines a second opening in the housing 12 (the rear door 18 is illustrated in a closed position in the drawings).

The doors 16, 18 are arranged such that, in use, the subject 26 follows a substantially linear path which includes entering the scanning zone 24 via the opening defined by the front door 16 in the housing 12 and exiting the scanning zone 24 via the opening defined by the rear door 18 in the housing. In other words, the subject 26 travels in a straight line through the apparatus 10 as part of a screening process.

In this example, the apparatus 10 is configured such that the linear path is unidirectional. In other words, the subject 26 enters the apparatus 10 through the front door 16 and exits through the rear door 18, in a straight line. However, it should be appreciated that the apparatus 10 may be used to facilitate bidirectional screening.

When the doors 16, 18 are closed, the housing 12 seals off the internal components, and in particular the scanning arrangement and displacing arrangement, which are described below.

The apparatus 10 includes a scanning arrangement in the form of an energy emitting source 20 and a CsI or GOS type detector 22, best shown in FIGS. 8 to 11. The source 20 and detector 22 are located on opposing sides of the scanning zone 24 defined in the housing 12. The scanning zone 24 is shaped and dimensioned such that the subject 26 is scanned while standing upright in the scanning zone 24, as shown in FIG. 3.

The energy emitting source 20 transmits an x-ray beam 28 in a transverse anatomical plane of the subject 26. It will be appreciated that the beam 28 is visible in the drawings only for the purpose of better illustrating the structure and functioning of the apparatus 10.

The apparatus 10 further includes an obtaining unit, which in this embodiment is in the form of a digital camera (not shown). The obtaining unit is configured to obtain data associated with the composition of the body of the subject 26. In other words, when the subject 26 enters the scanning zone 24, the obtaining unit analyses the subject 26 to determine the composition of the subject 26.

Figure 17:
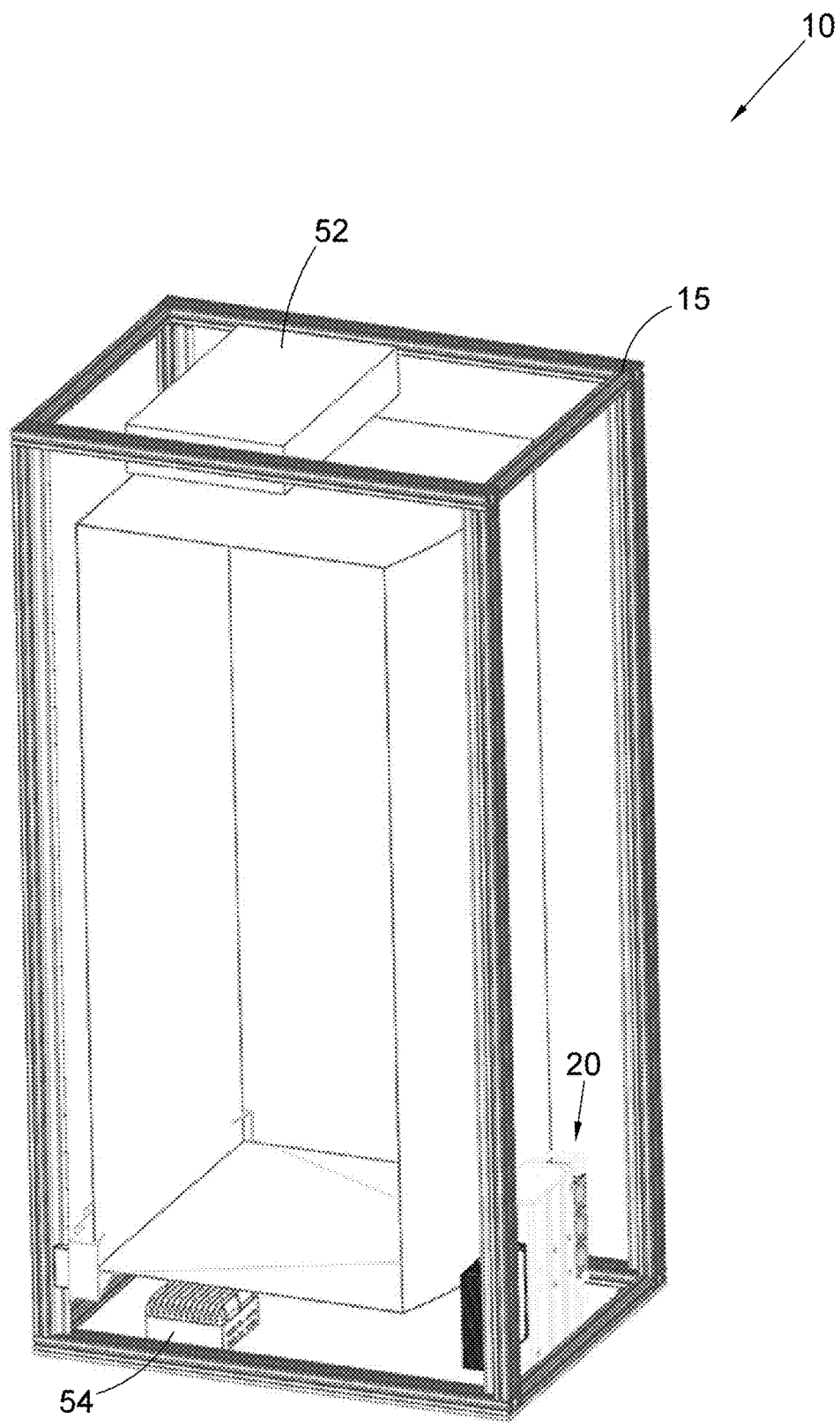
FIG. 17 shows another three-dimensional view of the imaging apparatus of FIG. 1, wherein certain further components of the apparatus are shown.
Figure 18:
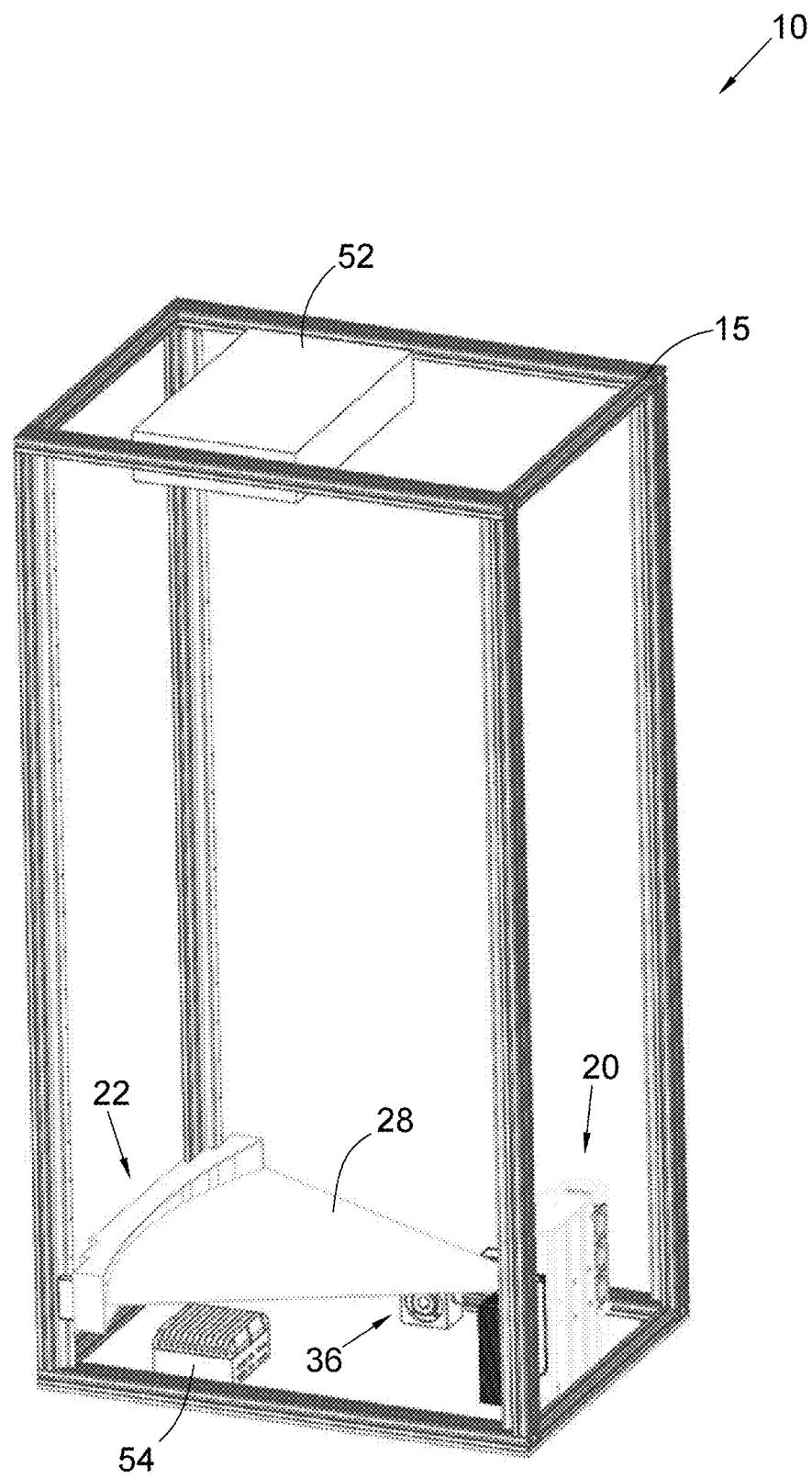
FIG. 18 shows another three-dimensional view of the imaging apparatus of FIG. 1, wherein certain further components of the apparatus are shown.

The apparatus 10 further includes a processor 54 which is communicatively coupled to the obtaining unit and serves as a control unit of the apparatus 10. The processor 54 is shown in FIGS. 17 and 18.

The processor 54 is configured to control one or more of a number of scanning parameters of the scanning arrangement based on the data obtained by the obtaining unit, and to generate the x-ray image of the subject 26 which can, for instance, be viewed by an operator of the apparatus 10.

The scanning parameters controllable by the processor 54 are the following:
  the rate at which the scanning arrangement moves relative to the subject, i.e. a scanning rate;
  the voltage of an x-ray tube being used;
  the current of the x-ray tube being used;
  the distance between the energy emitting source 20 and the subject 26; and/or
  the type of x-ray filter used.

The processor 54 further provides the functionality of an interlock unit in order to enable a so-called "hard interlock" configuration. The processor 54 is communicatively coupled to a magnetic locking mechanism (not shown) and a position sensor (not shown) associated with each door 16, 18. In use, the processor 54 designates both doors 16, 18 as normally unlocked and, in response to sensing by means of one of the position sensors that one of the doors 16, 18 has been opened, the processor 54 transmits a locking signal to the locking mechanism of the other one of the doors 16, 18. Furthermore, when scanning is in progress, the processor 54 transmits locking signals to the locking mechanisms of both doors 16, 18 to ensure that the doors 16, 18 remain closed during scanning.

The apparatus 10 includes a displacing arrangement 36 for displacing the scanning arrangement 20, 22 along a vertical axis of the apparatus 10 in a scanning direction (and thus along the length of the subject 26, in use). In this embodiment, the displacing arrangement 36 includes a belt-and-pulley drive arrangement comprising horizontal and vertical drive belts drivingly connected to pulleys. The belt-and-pulley drive arrangement is disposed adjacent to the scanning zone 24, partially surrounding it, in a U-shaped configuration, various portions of which are illustrated in FIGS. 5 to 14. The apparatus 10 is thus devoid of a conventional C-arm connection for mechanically connecting a source and detector. Instead, the source 20 and the detector 22 are collectively moved upwardly and downwardly relative to the housing 12 along the vertical axis by way of the horizontal and vertical drive belts and pulleys, in use.

The displacing arrangement 36 includes a motor 38 which drives a pair of horizontal drive belts 40, which in turn are drivingly connected to drive pulleys 42.1, which are arranged to displace the source 20 and the detector 22 relative to the housing 12 in the scanning direction by way of pairs of vertical drive belts 41 and pulleys 42.2, 42.3. Specifically, the source 20 is secured to a set of transversely spaced apart vertically extending belts 41 on one side of the scanning zone 24 whilst the detector 22 is secured to another opposing set of transversely spaced apart, vertically extending belts 41 on the other side of the scanning zone 24. On each side of the scanning zone 24, a lower set of pulleys 42.2 and an upper set of pulleys 42.3 are drivingly connected by transversely extending shafts 44, best shown in FIGS. 5 and 7. The motor 38 and horizontal drive belts 40 are located below the platform 34 and the displacing arrangement 36 thus does not restrict or impede linear movement of the subject 26 through the apparatus 10, as may be the case in conventional C-arm arrangements where subjects may be required to travel along a path which includes a 180 degree turn.

The displacing arrangement 36 is configured to ensure that the source 20 and the detector 22 remain aligned or in register in the horizontal plane as they move upwardly or downwardly along the vertical axis during the imaging process.

In order to ensure simultaneous upward or downward displacement of the source 20 and detector 22 relative to the housing 12, each of the source 20 and detector 22 are secured to the set of vertical drive belts 41 by way of an attachment formation 43 (see FIGS. 10 and 13) which clamps onto the respective vertical drive belts 41 at the same height and side thereof. Therefore, as the horizontal drive belts 40 are displaced by the motor 38, the scanning arrangement rises or falls together with one side of the vertical drive belts 41. In order to increase stability of the scanning arrangement whilst being displaced relative to the housing 12, a linear bearing 45 is provided in each corner, adjacent to each vertical drive belt 41. The source 20 and detector 22 both have a pair of linear bearing followers 46 which operatively slide up and down along the bearings 45 to ensure linear movement of the scanning arrangement.

In use, while the subject 26 stands in the apparatus 10 (see FIG. 3), the obtaining unit analyses the body of the subject 26 (i.e. captures an image thereof) to determine its variable composition and the processor 54 then controls/adapts one or more of the scanning parameters based on the composition of a region of the body of the subject to be scanned at a particular point in time in order to facilitate the generation of an image of predetermined quality or resolution, while minimising scanning time.

Scanning then commences, i.e. the scanning arrangement carries out x-ray scanning on the subject 26 by irradiating the subject 26, using the energy emitting source 20 to emit the x-ray beam 28 from one side of the scanning zone 24, through the subject 26, to the other side and detects or receives the emitted beam 28 using the detector 22 positioned on the other side of the scanning zone 24 while the source 20 and detector 22 are collectively moving vertically relative to the housing 12 along the vertical axis through actuation of the motor 38 of the displacing arrangement 36.

For instance, one of the scanning parameters may be adapted by scanning the legs 47 of the subject 26 at a relatively high speed, while the thorax and abdomen region 49, where higher x-ray penetration is required, is scanned at a lower speed. As a result, a subject having larger abdominal and thoracic dimensions than another subject will cause scanning to be carried out at a lower speed through the abdominal region than the speed required for the other subject, in order to achieve the required penetration and desired quality of imaging.

The processor 54 may also vary one or more scanning parameters, i.e. the voltage and/or current and/or x-ray filter of the scanning arrangement in accordance with variances in the composition of the body of the subject 26. For instance, the apparatus 10 may scan the thorax and abdomen 49 of the subject 26 using a higher voltage than for the rest of the body of the subject 26. Also, if the subject 26 has a relatively large thorax and abdomen, a higher voltage may be used than a voltage used for a subject with a smaller thorax and abdomen.

The distance between the source 20 and the subject 26 may also be adjusted based on the composition of the body of the subject 26 in order to generate a suitable image.

The apparatus 10 may select one or more x-ray filters (not shown) for the purpose of differentiation between materials consisting of different atomic numbers or optimally adjusting the filtration scanning parameter for the specific size subject and/or the type of object scanning i.e. for narcotics, explosives precious metals or stones.

A further feature of the apparatus 10, in this embodiment, is that it is configured to permit a certain region of the body of the subject 26 to be rescanned after an initial scan. User input is received from an operator of the apparatus 10 after the operator has viewed the first image generated by the apparatus 10, indicating a selected region in respect of which rescanning is required. The apparatus 10 is configured, in response to receiving the user input, to rescan the selected region using the scanning arrangement 20, 22.

In this example, the selected region is rescanned using an adjusted scanning parameter. Any of the scanning parameters referred to above may be adjusted when rescanning the selected region. For instance, the selected region may be rescanned at a relatively lower speed than a speed at which the selected region was previously scanned, thereby increasing penetration and producing a better image of the selected region only, and thus also serving to minimise scanning time and additional radiation received by the subject 26.

The apparatus 10 further includes an Uninterrupted Power Supply (UPS) 52, which is shown in FIGS. 17 and 18. The UPS 52 is coupled to the processor 54 and obtaining unit and is specifically configured to prevent the use of the apparatus 10 if sufficient power cannot be provided by the UPS 52 for the completion of the imaging of a subject, e.g. in case mains power supply is disconnected or interrupted and less than sufficient power remains in the UPS 52.

The Inventors envisage that various further features may be incorporated into embodiments of the invention, including:

The imaging apparatus may include a plurality of implicit biometric identification means.

The imaging apparatus may provide for the integration of ID readers by means of an ID Reader System Development Kit that may facilitate the development of customised ID reader interfaces by third parties without direct involvement from a manufacturer, distributor or supplier.

The imaging apparatus may be communicatively coupled to other devices via the Internet and/or the Internet of Things. The Internet of Things may facilitate the interconnection, via the Internet, of computing devices, e.g. devices embedded in everyday objects, thereby enabling them to send and receive data. To this end, the imaging apparatus may include any suitable communication module permitting such communication.

The imaging apparatus may interact with other devices for the purpose of leasing or renting the imaging apparatus, e.g. on a per transaction basis. Distributed ledger technology in conjunction with blockchain technology may be utilised in this regard. It is envisaged that this may vastly reduce transaction fees associated with the leasing or renting of the imaging apparatus.

The imaging apparatus may be communicatively coupled to a cloud-based database, wherein the database allows for the use and integration of any one or more of biometric identification means, images and radiation exposure data, thereby enabling the parameters of the imaging of a subject to incorporate the data of the combined effect of a plurality of subjects, check-points and/or scanning apparatuses within multiple geographic areas.

It will be appreciated that various configurations of off-site data collection systems may be utilised in embodiments of the invention.

A website may be provided by which one or more of the abovementioned aspects may be accessed and/or controlled and/or facilitated. For instance, the website may permit renting or leasing of the imaging apparatus and may employ blockchain technology, e.g. cryptocurrency payments.

In some embodiments, radio isotopes may be utilised as the source (e.g. the source 20) of the imaging apparatus.

An apparatus according to embodiments of the invention may be installed in a site such as, but not limited to, an airport or mine. For example, the apparatus 10 may be installed close to an entry to a secure area, such as an aeroplane itself. The apparatus 10 may be located distal the terminal, but proximal the aeroplane, e.g. at a passenger boarding bridge.

Figure 19:
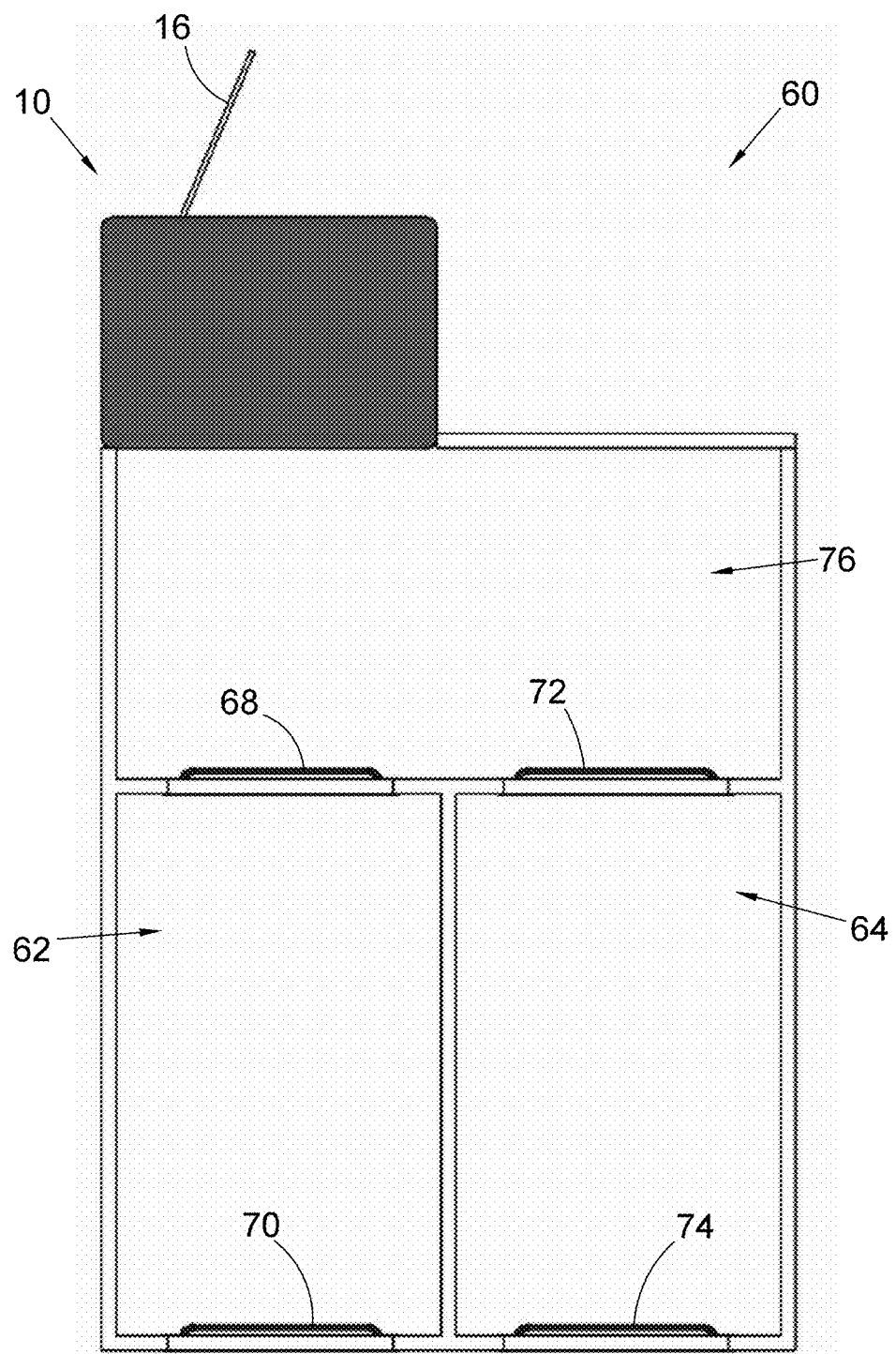
FIG. 19 shows a conceptual top view of a screening arrangement which includes the imaging apparatus of FIGS. 1 to 18.

A first example of a screening arrangement 60 according to the invention is shown in FIG. 19. The screening arrangement 60 includes the imaging apparatus 10 as described with reference to FIGS. 1 to 18 and also includes two modular holding rooms 62, 64 attached to the apparatus 10. The holding rooms 62, 64 and the apparatus 10 are thus integral and can be deployed as a unit.

The holding room 62 has an entrance door 68 and an exit door 70 and the holding room 64 also has an entrance door 72 and an exit door 74. An enclosed intermediate zone 76 is defined between the apparatus 10 and the holding rooms 62, 64.

The screening arrangement 60 can typically be positioned at a boundary between an unscreened area and a screened area (or at some other transition from an unscreened area to a screened area) such that subjects are required to travel through the scanning zone 24 of the apparatus 10 in order to move from the unscreened area to the screened area. For instance, the unscreened area may be a public area of an airport and the screened area may be a so-called "sterile" area of the airport.

In the screening arrangement 60 of FIG. 19, the holding room 62 is a primary holding room and the holding room 64 is a secondary holding room, arranged in parallel with the holding room 62. The linear path described above (i.e. the straight line of travel which includes entering the scanning zone 24 via the door 16 and exiting the scanning zone 24 via the door 18) in this case includes entering and exiting the primary holding room 62. The door 18 is arranged such that it leads into the entrance door 68 of the holding room 62. The secondary holding room 64 may be used for further screening or interrogation, ensuring substantially uninterrupted flow along the linear path through the apparatus 10 and the holding room 62.

For example, the subject 26 may enter the apparatus 10 via the door 16, be scanned in the scanning zone 24, exit the apparatus 10 via the door 18, enter the holding room 62 via the door 68 and exit the holding room 62 via the door 70. Another subject may be scanned in the scanning zone 24 while the subject 26 is held in the holding room 62 (possibly while a further subject is held in the holding room 64).

Figure 20:
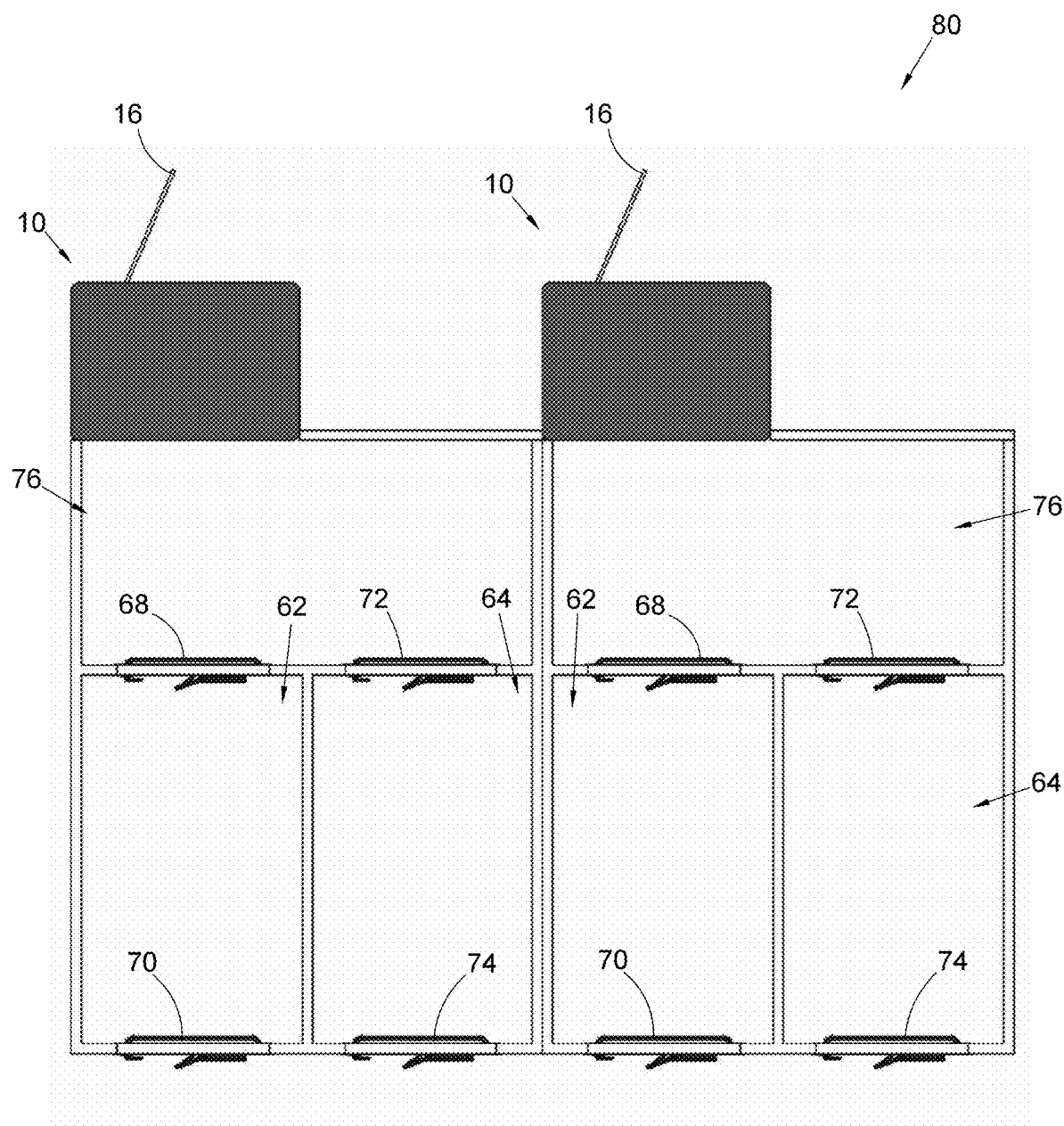
FIG. 20 shows a conceptual top view of another screening arrangement which includes two imaging apparatuses such as the one of FIGS. 1 to 18.
Figure 21:
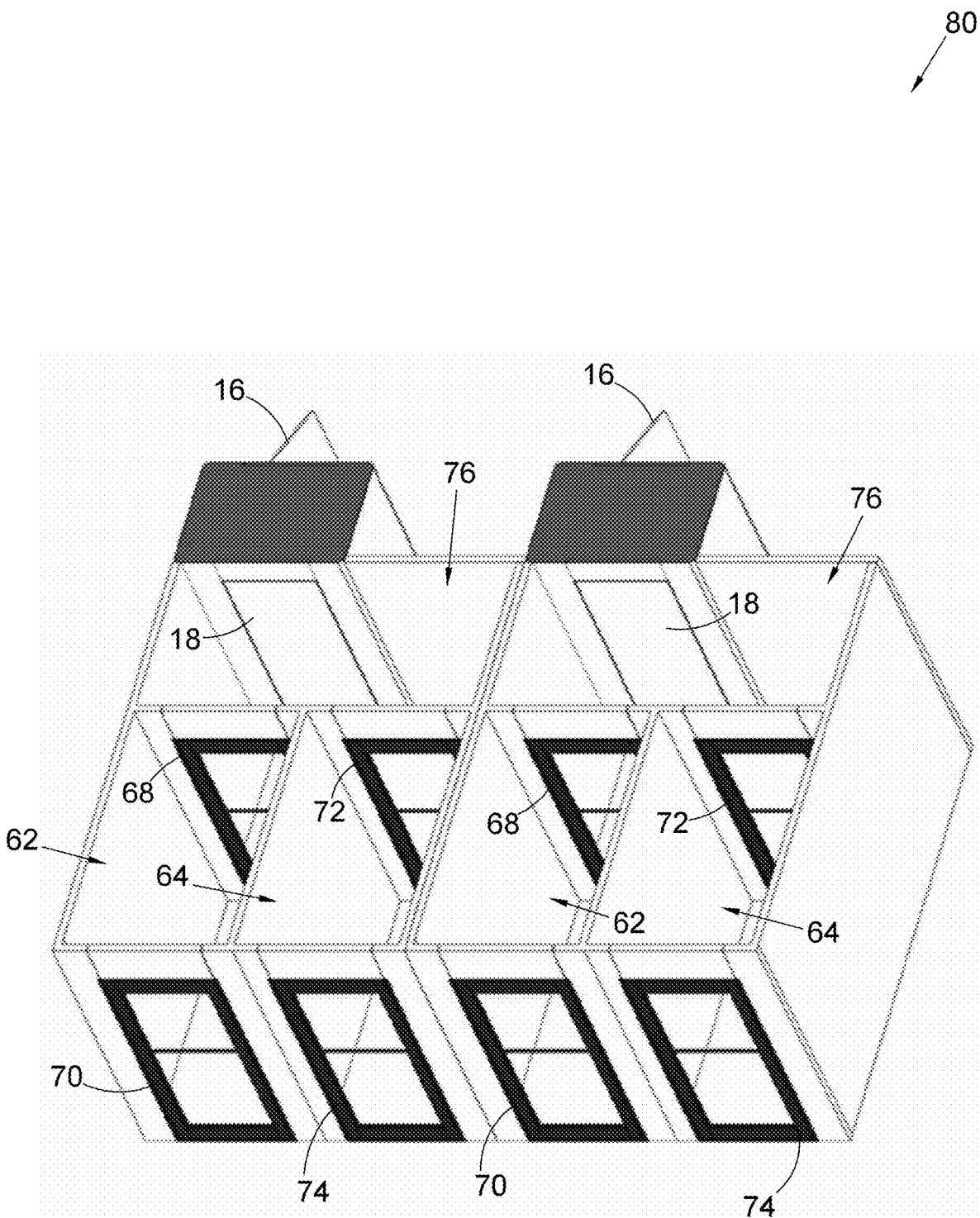
FIG. 21 shows a conceptual three-dimensional view of the screening arrangement of FIG. 20.

A further example of a screening arrangement 80 is shown in FIGS. 20 and 21. The screening arrangement 80 is provided by two of the screening arrangements 60 of FIG. 20 arranged in a side-by-side manner.

Figure 22:
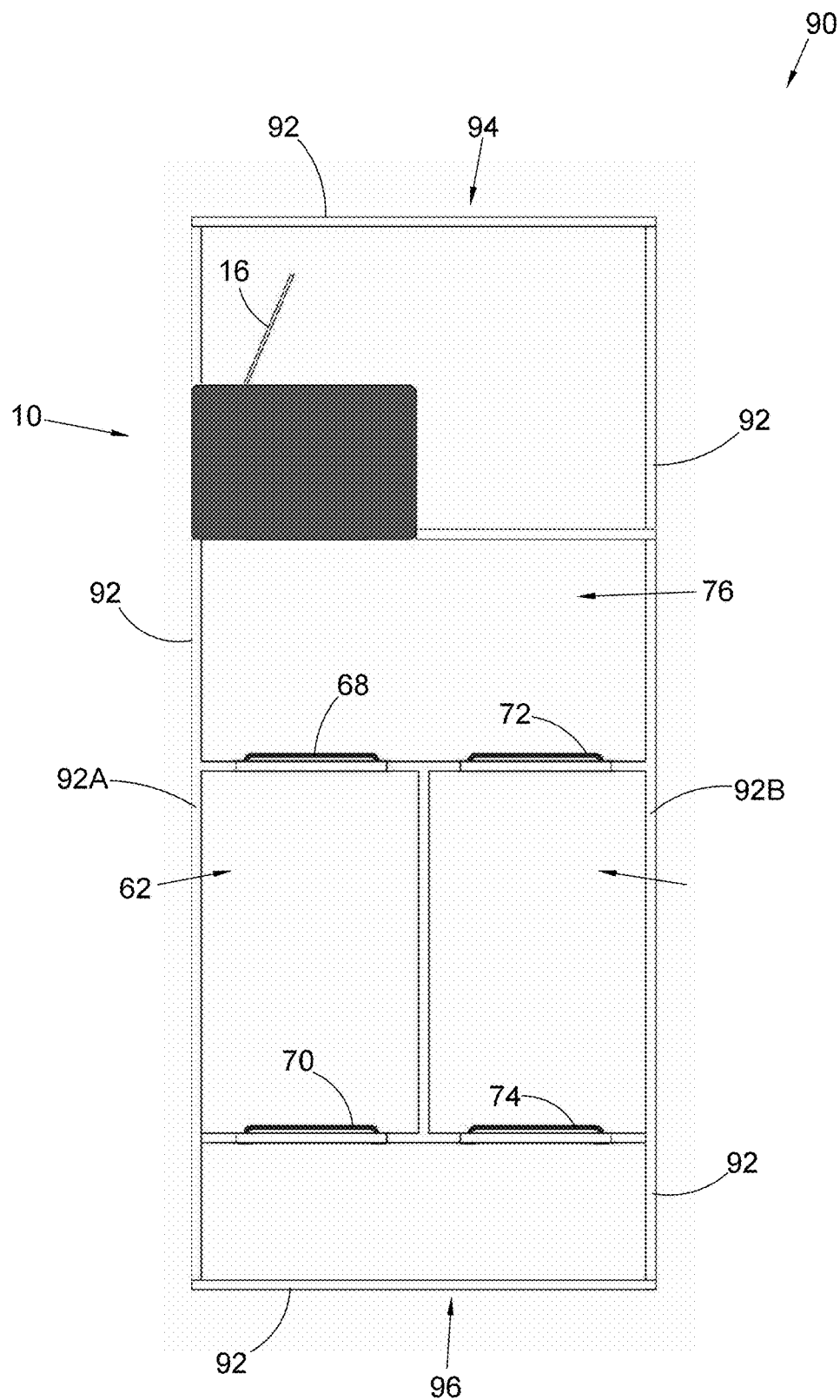
FIG. 22 shows a conceptual top view of a container unit which includes the imaging apparatus of FIGS. 1 to 18.

FIG. 22 shows an example of the manner in which the screening arrangement 60 of FIG. 19 may be manufactured in a movable container 90 so as to form a container unit. The container 90 has a rectangularly cuboidal shape defined by sidewalls 92.

The apparatus 10 and the holding rooms 62, 64 are integral with the container 90. More specifically, a side of the apparatus 10 interrupts one of the sidewalls 92 of the container 92, while two of the sidewalls 92 of the container 90 define respective exterior sidewalls of the holding rooms 62, 64, as indicated by the reference numerals 92A and 92B in FIG. 22.

The container 90 defines an entry zone 94 from where a subject can enter the apparatus 10. The container 90 further defines an exit zone 96 from where the subject can leave one of the holding rooms 62, 64 and exit the container 90.

The imaging apparatus and/or holding room(s) and/or container described herein may be provided in kit form for deployment at a desired facility. A conventional container, such as a shipping container, may be used and the apparatus 10 and/or one or more holding rooms may be included therein, as shown in FIG. 22, to form a container unit.

The Inventors believe that embodiments of the present invention provide numerous advantages.

The Inventors have found that the imaging apparatus may have a relatively small footprint, making it relatively easy to install and/or reposition. The apparatus and/or the use of modular holding rooms may assist in optimising the use of floor space.

Furthermore, the displacing arrangement as described herein may facilitate the reduction in dimensions of an imaging apparatus and/or may facilitate or optimise passage of a subject in or through the apparatus and a screening arrangement. Specifically, the imaging apparatus is devoid of a C-arm, enabling the subject to travel in a straight line through the apparatus. The displacing arrangement 36 is disposed in a U-shaped configuration around the scanning zone 24 in such a way that it does not impede or restrict movement of the subject through the scanning zone 24.

The imaging apparatus may be manufactured in a standard shipping container, enabling rapid deployment and/or re-deployment of the apparatus. In the Inventors' experience, typically, an imaging apparatus is installed on site as a first step, after which holding rooms and/or other extras are added in one or more further steps. Contrastingly, in embodiments of the present invention, the imaging apparatus and holding room(s) (and optionally also a container) form a unit and can thus be deployed to a site simultaneously. The use of a screening arrangement as described herein will thus obviate the need for civil, mechanical, electrical and/or instrumentational contractors to provide additional functionality after an initial installation.

Furthermore, in embodiments as described herein, if a particular subject is identified for further screening, questioning, or the like, the flow of subjects through the screening arrangement is not interrupted or restricted (or is minimally interrupted or restricted).

The Inventors also believe that features such as the interlock unit and cameras installed in the apparatus may provide enhanced security.

The Inventors have found that the configuration of the apparatus as described herein may reduce peripheral or scatter radiation as a result of the seal provided by the housing. The housing may also dampen noise generated by components of the imaging apparatus, such as the displacing arrangement.

It should be appreciated that the imaging apparatus described herein may typically be configured to be used in relatively low dosage applications, as opposed to certain medical applications with significantly higher relative dosages. Specifically, the imaging apparatus may be configured to expose the subject to an effective radiation dose in the region of 15 micro Sievert (µSv) or less, per scan. In some implementations, this effective radiation dose may be in the region of 100 nSv or less, per scan.

The invention claimed is:

1. An imaging apparatus for generating an image of a subject, the imaging apparatus comprising:
   a scanning arrangement which includes an energy emitting source which emits x-rays and a detector;
   a housing which houses the scanning arrangement and includes an internal scanning zone or area defined between a platform upon which the subject stands, a ceiling positioned above the subject, two side walls, and first and second openings to permit ingress and egress of the subject into and from the housing for scanning by the scanning arrangement;
   the energy emitting source and detector positioned on opposing sides of the internal scanning zone outside of the scanning zone;
   a displacing arrangement which serves operatively to interconnect the energy emitting source and detector and is housed within the housing and is configured to collectively displace the energy emitting source and detector relative to the housing in a scanning direction such that the energy emitting source and detector remain aligned in a plane transverse to the scanning direction in order to scan the subject in the internal scanning zone;
   and
   the second opening is positioned opposite the first opening in the housing,
   wherein the first opening and the second opening are arranged at or near opposing ends or sides of the housing so as to define a substantially linear path between them, such that, in use, the subject travels in a substantially straight line along the linear path by entering the internal scanning zone via the first opening and exiting the scanning zone through the second opening;
   wherein at least part of the displacing arrangement operatively connecting the energy emitting source and detector together is not disposed in the internal scanning zone and is not itself displaced relative to the housing in the scanning direction in which the energy emitting source and detector are displaced during scanning such that the displacing arrangement does not restrict or impede movement of the subject through the internal scanning zone and
   wherein the displacing arrangement includes a belt-and-pulley drive arrangement configured to displace the scanning arrangement along a vertical axis of the imaging apparatus with at least one motor drivingly connected to the belt and pulley drive arrangement, wherein the entire motor and at least all or part of the belt-and-pulley drive arrangement are disposed above the ceiling of the housing or below the platform upon which the subject stands.

2. The imaging apparatus as claimed in claim 1, wherein the first opening includes a first door for closing the first opening and a second door for closing the second opening.

3. An imaging apparatus as claimed in claim 2, which includes an interlock unit which is communicatively coupled to a locking mechanism and a position sensor or switch associated with each door, the interlock unit being configured to provide a hard interlock and being configured to designate both doors as normally locked, the interlock unit further being configured to transmit an unlocking signal to the locking mechanism of one of the doors in response to identification of the subject, wherein the interlock unit is configured to transmit locking signals to the locking mechanism of both doors when scanning is in progress and wherein the interlock unit is configured to retain at least one of the doors in a locked condition at all times.

4. An imaging apparatus as claimed in claim 1, wherein the part of the displacing arrangement connecting the energy emitting source and detector together is disposed above or below the scanning zone.

5. An imaging apparatus as claimed in claim 1, wherein the displacing arrangement is configured collinearly to displace the energy emitting source and the detector relative to the housing.

6. An imaging apparatus as claimed in claim 1, which includes an image generating unit configured to generate the image of the subject, the image generating unit being interfaced to the detector and to a processor.

7. An imaging apparatus as claimed in claim 1, wherein the housing has a substantially rectangularly cuboidal shape and defines a front, a rear and two sides of the imaging apparatus, a first door being located at the front of the imaging apparatus and a second door being located at the rear of the imaging apparatus such that the subject travels substantially in a straight line through the imaging apparatus as part of a screening process.

8. An imaging apparatus as claimed in claim 1, wherein the linear path is bidirectional such that when the apparatus operates in a first direction the first opening is an entrance and the second opening is an exit and when the apparatus operates in an opposing direction the second opening is an entrance and the first opening is an exit.

9. An imaging apparatus as claimed in claim 1, which includes one or more biometric or proximity type readers for identification of the subject.

10. An imaging apparatus as claimed in claim 1, wherein the energy emitting source is configured to emit a beam of x-rays in a transverse anatomical plane of the subject.

11. An imaging apparatus as claimed in claim 1, which is configured to identify a subject being scanned for a first time and to assign a unique identifier to the subject, the imaging apparatus being configured to communicate data associated with the unique identifier to a remote server or database, and/or to receive data from the remote server or database.

12. The imaging apparatus of claim 1, further comprising a first door positioned over the first opening and a second door positioned over the second opening, wherein the housing is enclosed to deter excessive peripheral or scatter radiation outside of the housing during operation.

13. An imaging apparatus for generating an image of a subject, the imaging apparatus comprising:
   a scanning arrangement which includes an energy emitting source which emits x-rays and a detector;
   a housing which houses the scanning arrangement, and which defines an internal scanning zone or area in which the subject is operatively positioned for scanning by the scanning arrangement;
   the energy emitting source and detector positioned on opposing sides of the internal scanning zone:
   a displacing arrangement which serves operatively to interconnect the energy emitting source and detector and is housed within the housing and is configured to collectively displace the energy emitting source and detector relative to the housing in a scanning direction such that the energy emitting source and detector remain aligned in a plane transverse to the scanning direction in order to scan the subject in the scanning zone;
   a first opening and
   a second opening in the housing,
   wherein the first opening and the second opening are arranged at or near opposing ends or sides of the housing so as to define a substantially linear path between them, such that, in use, the subject travels in a substantially straight line along the linear path by entering the scanning zone via one of the openings in the housing and exiting the scanning zone via the other one of the openings in the housing;
   wherein at least part of the displacing arrangement operatively connecting the energy emitting source and detector together is not disposed in the scanning zone and is not itself displaced relative to the housing in the scanning direction in which the energy emitting source and detector are displaced during scanning such that the displacing arrangement does not restrict or impede movement of the subject through the scanning zone and
   wherein the displacing arrangement includes a belt-and-pulley drive arrangement configured to displace the scanning arrangement along a vertical axis of the imaging apparatus with at least one motor drivingly connected to the belt and pulley drive arrangement, wherein the entire motor and at least part of the belt-and-pulley drive arrangement are disposed above or below the scanning zone; and
   the belt-and-pulley drive arrangement includes first and second drive belts drivingly connected to pulleys in a U-shaped configuration around the scanning zone, wherein a pair of the first drive belts, which serve to connect the energy emitting source and detector together, are disposed above or below the scanning zone.

14. An imaging apparatus as claimed in claim 13, wherein the second drive belts of the belt-and-pulley drive arrangement of the displacing arrangement are configured to displace the scanning arrangement along a vertical axis of the imaging apparatus, and wherein the first drive belts of the belt-and-pulley drive arrangement of the displacing arrangement extend laterally from one side of the housing to the other.

15. An imaging apparatus as claimed in claim 14, which is devoid of a C-shaped arm mechanically connecting the energy emitting source and detector together.

16. An imaging apparatus as claimed in claim 13, wherein the energy emitting source is secured to a set of transversely spaced apart, vertically extending drive belts on one side of the scanning zone whilst the detector is secured to another opposing set of transversely spaced apart, vertically extending drive belts on the other side of the scanning zone, wherein a lower set of pulleys and an upper set of pulleys, on each side of the scanning zone, are drivingly connected by transversely extending shafts and wherein the motor is located below the scanning zone and is drivingly connected to the lower sets of pulleys via the pair of first drive belts to ensure simultaneous upward or downward displacement of the energy emitting source and detector relative to the housing, wherein each of the source and detector are secured to the set of vertical drive belts by way of an attachment formation which clamps onto the respective vertical drive belts at the same height and side thereof, such that, as the first drive belts are displaced by the motor, the scanning arrangement rises or falls together with one side of the vertical drive belts, and wherein a linear bearing is provided in each corner, adjacent to each vertical drive belt, the energy emitting source and detector both having a pair of linear bearing followers which operatively slide up and down along the linear bearings to ensure linear movement of the scanning arrangement.

* * * * *